(12) United States Patent
Kanayama et al.

(10) Patent No.: US 6,783,204 B1
(45) Date of Patent: Aug. 31, 2004

(54) INK-JET IMAGE-FORMING METHOD AND IMAGE-FORMING APPARATUS

(75) Inventors: Yoshio Kanayama, Nabari (JP); Kenji Tanaka, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/642,148

(22) Filed: Aug. 21, 2000

(30) Foreign Application Priority Data

Aug. 24, 1999 (JP) .......................... 11-237536
Mar. 27, 2000 (JP) ........................ 2000-087344

(51) Int. Cl.⁷ .................. B41J 29/377; B41J 2/205
(52) U.S. Cl. ................................ 347/19; 347/15
(58) Field of Search ................ 347/14, 15, 19, 347/43

(56) References Cited

U.S. PATENT DOCUMENTS

| | | | | |
|---|---|---|---|---|
| 4,682,216 A | | 7/1987 | Sasaki et al. | .......... 358/79 |
| 5,416,612 A | * | 5/1995 | Ingraham et al. | ......... 358/501 |
| 5,530,555 A | * | 6/1996 | Taaka et al. | ......... 347/131 |
| 5,550,569 A | | 8/1996 | Wright | ............ 347/15 |
| 5,568,169 A | * | 10/1996 | Dudek et al. | ........... 347/43 |
| 5,570,118 A | | 10/1996 | Rezanka et al. | ......... 347/43 |
| 5,596,355 A | * | 1/1997 | Koyama et al. | .......... 347/43 |
| 5,992,971 A | | 11/1999 | Takahashi et al. | |
| 6,084,604 A | | 7/2000 | Moriyama et al. | |
| 6,186,615 B1 | | 2/2001 | Sato et al. | |
| 2002/0054186 A1 | | 5/2002 | Hotomi et al. | |

FOREIGN PATENT DOCUMENTS

| | | | | |
|---|---|---|---|---|
| JP | 06-135006 | 5/1994 | | |
| JP | 06-152898 | 5/1994 | | |
| JP | 07-117331 | 5/1995 | | |
| JP | 7149036 | 6/1995 | | |
| JP | 07149036 | * 6/1995 | ......... 347/43 |
| JP | 08-187880 | 7/1996 | | |
| JP | 8197831 | 8/1996 | | |
| JP | 08197831 | * 8/1996 | ......... 347/43 |
| JP | 8336961 | 12/1996 | | |
| JP | 10-324009 | 12/1998 | | |

* cited by examiner

Primary Examiner—John Barlow
Assistant Examiner—An H. Do
(74) Attorney, Agent, or Firm—Birch, Stewart, Kolasch, & Birch LLP.

(57) ABSTRACT

An ink-jet image-forming method having the steps of: setting image areas, each having a predetermined range, in association with respective dots, and calculating a black dot area rate representing the density of dots formed in each image area. In the case when, among these dots, a group of high-density dots corresponding to image areas in which the black dot area rate is greater than a predetermined value are printed, slow-drying ink and quick-drying ink are used. In the case when dots having a black dot area rate smaller than the predetermined value are printed, the slow-drying ink is used. Thus, it is possible to shorten the ink drying time, and also to prevent degradation in the image quality.

44 Claims, 27 Drawing Sheets

AREA RATE 25%

AREA RATE 50%

AREA RATE 75%

AREA RATE 100%

FIG. 13

| $C_{ad} 2^0$ | 1 | 0 | 1 | 0 | 1 | 0 |
|---|---|---|---|---|---|---|
| $R_{ad} 2^0$ row. \ col. | 1 | 2 | 3 | 4 | 5 | 6 |
| 1 | 1 | K |   | K |   |   |   |
| 0 | 2 |   | K |   | K | K | K |
| 1 | 3 | K | K | K | K | K | K |
| 0 | 4 |   | K | K | K | K | C |
| 1 | 5 |   | K |   | K | K | C |
| 0 | 6 |   | K |   | K | K | C |
| 1 | 7 | Y | K |   | C | K | C |
| 0 | 8 | Y | Y |   | M | C | M |

Co  50

DATA BEFORE CONVERSION

FIG.14

| Rad $2^0$ | Cad $2^0$ row\col. | 1 (1) | 0 (2) | 1 (3) | 0 (4) | 1 (5) | 0 (6) |
|---|---|---|---|---|---|---|---|
| 1 | 1 | 2/9 |  | 3/9 |  |  |  |
| 0 | 2 |  | 6/9 |  | 6/9 | ✕ | 4/9 |
| 1 | 3 | 4/9 | ✕ | 8/9 | ✕ | 8/9 | ✕ |
| 0 | 4 |  | 6/9 | ✕ | 8/9 | ✕ | C |
| 1 | 5 |  | ✕ |  | ✕ | 6/9 | C |
| 0 | 6 |  | 3/9 |  | 5/9 | ✕ | C |
| 1 | 7 | Y | ✕ |  | C | 3/9 | C |
| 0 | 8 | Y | Y |  | M | C | M |

Co  50

BLACK DOT AREA RATE
(WHERE ALL DATA D OF ADJACENT CELLS Co ARE ZERO)

FIG.15

| $R_{ad}2^0$ | Cad $2^0$ row\col. | 1 (1) | 0 (2) | 1 (3) | 0 (4) | 1 (5) | 0 (6) |
|---|---|---|---|---|---|---|---|
| 1 | 1 | K |   | K |   |   |   |
| 0 | 2 |   | K |   | K | YMC | K |
| 1 | 3 | K | YMC | K | YMC | K | YMC |
| 0 | 4 |   | K | YMC | K | YMC | C |
| 1 | 5 |   | K |   | YMC | K | C |
| 0 | 6 |   | K |   | K | YMC | C |
| 1 | 7 | Y | YMC |   | C | K | C |
| 0 | 8 | Y | Y |   | M | C | M |

Co  50

DATA AFTER CONVERSION

FIG. 16

| Cad $2^0$ | 1 | 0 | 1 | 0 | 1 | 0 |
|---|---|---|---|---|---|---|
| Rad $2^0$ / row / col. | 1 | 2 | 3 | 4 | 5 | 6 |
| 1 / 1 | 25 |  | 25 |  |  |  |
| 0 / 2 |  | 50 |  | 75 | 75 | 100 |
| 1 / 3 | 25 | 100 | 50 | 100 | 100 | 100 |
| 0 / 4 |  | 100 | 75 | 100 | 100 | C |
| 1 / 5 |  | 100 |  | 100 | 100 | C |
| 0 / 6 |  | 100 |  | 75 | 100 | C |
| 1 / 7 | Y | 50 |  | C | 100 | C |
| 0 / 8 | Y | Y |  | M | C | M |

Co  50

DATA BEFORE CONVERSION

FIG. 17

| $R_{ad} 2^0$ | $C_{ad} 2^0$ row. \ col. | 1 | 0 | 1 | 0 | 1 | 0 |
|---|---|---|---|---|---|---|---|
|   |   | 1 | 2 | 3 | 4 | 5 | 6 |
| 1 | 1 | 9 |    | 18 |    |    |    |
| 0 | 2 |    | 31 |    | 47 | 61 | 42 |
| 1 | 3 | 32 | 44 | 72 | 75 | 83 | 53 |
| 0 | 4 |    | 50 | 81 | 81 | 78 | C  |
| 1 | 5 |    | 42 |    | 72 | 64 | C  |
| 0 | 6 |    | 28 |    | 53 | 53 | C  |
| 1 | 7 | Y  | 17 |    | C  | 31 | C  |
| 0 | 8 | Y  | Y  |    | M  | C  | M  |

Co   50

BLACK DOT AREA RATE
(WHERE ALL DATA D OF ADJACENT CELLS Co ARE ZERO)

| Cad $2^0$ | 1 | 0 | 1 | 0 | 1 | 0 |
|---|---|---|---|---|---|---|
| Rad $2^0$ row \ col. | 1 | 2 | 3 | 4 | 5 | 6 |
| 1  1 | 25 |  | 25 |  |  |  |
| 0  2 |  | 50 |  | 75 ymc | 50 YMC | 100 |
| 1  3 | 25 | 100 | 50 | 50 YMC | 50 YMC | 50 YMC |
| 0  4 |  | 50 YMC | 50 ymc | 50 YMC | 50 YMC | C |
| 1  5 |  | 100 |  | 50 YMC | 50 YMC | C |
| 0  6 |  | 50 ymc |  | 50 ymc | 50 YMC | C |
| 1  7 | Y | 50 |  | C | 50 YMC | C |
| 0  8 | Y | Y |  | M | C | M |

Co ↑ 50

DATA AFTER CONVERSION ( FIGURES REPRESENT DOT AREA RATES % OF FIRST BLACK K

REPRESENTS SUPERPOSED JETS OF K50%, Y50% M50% AND C50%

REPRESENTS SUPERPOSED JETS OF K50%, Y75% M75% AND C75% )

FIG. 21

| $C_{ad}2^0$ Col. / $R_{ad}2^0$ row. | 1 1 | 0 2 | 1 3 | 0 4 | 1 5 | 0 6 | 1 7 | 0 8 | 1 9 | 0 10 | 1 11 | 0 12 | 1 13 | 0 14 | 1 15 | 0 16 |
|---|---|---|---|---|---|---|---|---|---|---|---|---|---|---|---|---|
| 1 1 | | | | | | | | | | | | | | | | |
| 0 2 | | | | | | | | | | | | | | | | |
| 1 3 | | | K | K | | | | | | | | | | | | |
| 0 4 | | | | K | K | K | | | | | | | | | | |
| 1 5 | | | | | K | | K | | | | | | | | | |
| 0 6 | | | | | | K | K | K | K | K | | | | | | |
| 1 7 | | | | | K | K | K | K | K | K | K | K | K | | | |
| 0 8 | | | | | | K | K | K | K | K | K | K | K | K | | |
| 1 9 | | | | | | | | K | K | K | K | K | K | K | | |
| 0 10 | | | | | | | | | K | K | K | K | K | K | | |
| 1 11 | | | | | | | | | | K | K | K | K | | | |
| 0 12 | | | | | | | | | | | K | K | K | K | | |
| 1 13 | | | | | | | K | K | K | K | K | K | K | K | C | C |
| 0 14 | | | | | | K | K | K | K | K | K | K | K | K | C | C |
| 1 15 | | | | | Y | Y | Y | Y | M | M | M | M | M | M | C | C |
| 0 16 | | | | | Y | Y | Y | Y | M | M | M | M | M | | C | C |

50

Co

DATA BEFORE CONVERSION

FIG. 22

| $C_{ad}2^0$ | 1 | 0 | 1 | 0 | 1 | 0 | 1 | 0 | 1 | 0 | 1 | 0 | 1 | 0 | 1 | 0 |
|---|---|---|---|---|---|---|---|---|---|---|---|---|---|---|---|---|
| $R_{ad}2^0$ \ col./row. | 1 | 2 | 3 | 4 | 5 | 6 | 7 | 8 | 9 | 10 | 11 | 12 | 13 | 14 | 15 | 16 |
| 1 | 1 | | | | | | | | | | | | | | | |
| 0 | 2 | | | | | | | | | | | | | | | |
| 1 | 3 | | | 4/9 | 5/9 | | | | | | | | | | | |
| 0 | 4 | | | 5/9 | 7/9 | | | | | | | | | | | |
| 1 | 5 | | | | 6/9 | 4/9 | | | | | | | | | | |
| 0 | 6 | | | | 4/9 | | 7/9 | 8/9 | 9/9 | 7/9 | 6/9 | 5/9 | | | | |
| 1 | 7 | | | | | | | 4/9 | 7/9 | 9/9 | 9/9 | 9/9 | 6/9 | 7/9 | 6/9 | 5/9 | |
| 0 | 8 | | | | | | | | 7/9 | 9/9 | 9/9 | 9/9 | 9/9 | 9/9 | 8/9 | 6/9 | 3/9 |
| 1 | 9 | | | | | | | | | 6/9 | 9/9 | 9/9 | 9/9 | 9/9 | 9/9 | 6/9 | 7/9 | 5/9 |
| 0 | 10 | | | | | | | | | | 6/9 | 9/9 | 9/9 | 9/9 | 6/9 | 7/9 | 5/9 |
| 1 | 11 | | | | | | | | | | | 5/9 | 9/9 | 9/9 | 8/9 | 7/9 | 5/9 |
| 0 | 12 | | | | | | | | | | | | 6/9 | 9/9 | 9/9 | 8/9 | |
| 1 | 13 | | | | | | | | | | | | 6/9 | 9/9 | 9/9 | 8/9 | 7/9 | 6/9 | 6/9 | 6/9 | 4/9 | C | C |
| 0 | 14 | | | | | | | | | | | | | 4/9 | 5/9 | 6/9 | 6/9 | 6/9 | 6/9 | 6/9 | 6/9 | 4/9 | C | C |
| 1 | 15 | | | | | Y | Y | Y | Y | M | M | M | M | M | M | C | C | C |
| 0 | 16 | | | | | Y | Y | Y | Y | M | M | M | M | M | M | C | C | C |

50

Co } BLACK DOT AREA RATE

FIG. 23

| $C_{ad}2^0$ | 1 | 0 | 1 | 0 | 1 | 0 | 1 | 0 | 1 | 0 | 1 | 0 | 1 | 0 | 1 | 0 |
|---|---|---|---|---|---|---|---|---|---|---|---|---|---|---|---|---|
| $R_{ad}2^0$ \ col. \ row. | 1 | 2 | 3 | 4 | 5 | 6 | 7 | 8 | 9 | 10 | 11 | 12 | 13 | 14 | 15 | 16 |
| 1 | 1 |   |   |   |   |   |   |   |   |   |   |   |   |   |   |   |
| 0 | 2 |   |   |   |   |   |   |   |   |   |   |   |   |   |   |   |
| 1 | 3 |   |   |   |   | 1 | 1 |   |   |   |   |   |   |   |   |   |
| 0 | 4 |   |   |   | 1 | 1 | 1 |   |   |   |   |   |   |   |   |   |
| 1 | 5 |   |   | 1 |   |   | 1 |   |   |   |   |   |   |   |   |   |
| 0 | 6 |   |   | 1 |   |   | 1 | 1 | 1 | 1 | 1 |   |   |   |   |   |
| 1 | 7 |   |   | 1 |   |   |   |   |   | 1 | 1 | 1 |   |   |   |   |
| 0 | 8 |   |   | 1 |   |   |   |   |   |   |   | 1 | 1 | 1 |   |   |
| 1 | 9 |   |   | 1 |   |   |   |   |   |   |   |   | 1 | 1 |   |   |
| 0 | 10 |   |   | 1 |   |   |   |   |   |   | 1 | 1 | 1 |   |   |   |
| 1 | 11 |   |   | 1 |   |   |   |   |   |   | 1 | 1 |   |   |   |   |
| 0 | 12 |   |   | 1 |   |   |   |   |   | 1 |   | 1 |   |   |   |   |
| 1 | 13 |   |   | 1 |   |   | 1 |   | 1 | 1 | 1 | 1 | 1 | 1 | 1 |   |
| 0 | 14 |   |   | 1 |   |   | 1 | 1 | 1 | 1 | 1 | 1 | 1 | 1 | 1 |   |
| 1 | 15 |   |   |   |   |   |   |   |   |   |   |   |   |   |   |   |
| 0 | 16 |   |   |   |   |   |   |   |   |   |   |   |   |   |   |   |

Co ← 50

OUTLINE BIT MAP

FIG. 24

DATA AFTER CONVERSION

| $C_{ad}2^0$ | 1 | 0 | 1 | 0 | 1 | 0 | 1 | 0 | 1 | 0 | 1 | 0 | 1 | 0 | 1 | 0 |
|---|---|---|---|---|---|---|---|---|---|---|---|---|---|---|---|---|
| $R_{ad}2^0$ \ col.<br>row | 1 | 2 | 3 | 4 | 5 | 6 | 7 | 8 | 9 | 10 | 11 | 12 | 13 | 14 | 15 | 16 |
| 1 | 1 |   |   |   |   |   |   |   |   |   |   |   |   |   |   |   |
| 0 | 2 |   |   |   |   |   |   |   |   |   |   |   |   |   |   |   |
| 1 | 3 |   |   | 25 | 25 |   |   |   |   |   |   |   |   |   |   |   |
| 0 | 4 |   |   | 25 | 25 | 25 | 25 |   |   |   |   |   |   |   |   |   |
| 1 | 5 |   |   |   | 25 | 100 |   |   |   |   |   |   |   |   |   |   |
| 0 | 6 |   |   |   |   |   | 50 | 50 | 50 | 50 | 50 |   |   |   |   |   |
| 1 | 7 |   |   |   |   |   | 50 | 50 | 100 | 100 | 75 | 75 | 75 | 75 | 75 |   |
| 0 | 8 |   |   |   |   |   |   | 50 | 100 | 100 | 75 | 75 | 75 | 75 | 75 | 100 | 25 |
| 1 | 9 |   |   |   |   |   |   |   | 50 | 100 | 100 | 75 | 75 | 75 | 75 | 75 | 100 |
| 0 | 10 |   |   |   |   |   |   |   |   | 50 | 100 | 100 | 100 | 100 | 100 | 100 |   |
| 1 | 11 |   |   |   |   |   |   |   |   |   | 50 | 100 | 100 | 100 | 100 |   |   |
| 0 | 12 |   |   |   |   |   |   |   |   |   |   | 50 | 100 | 100 | 100 |   |   |
| 1 | 13 |   |   |   |   |   |   |   |   |   |   |   | 50 | 100 | 100 | 100 | 100 | 100 | 100 | 100 | 100 | 100 | C | C |
| 0 | 14 |   |   |   |   |   |   |   |   |   |   |   |   | 50 | 75 | 75 | 75 | 75 | 75 | 75 | 75 | 75 | 75 | C | C |
| 1 | 15 |   |   |   | Y | Y | Y | Y | M | M | M | M | M | M | C | C | C |
| 0 | 16 |   |   |   | Y | Y | Y | Y | M | M | M | M | M | M | C | C | C |

50 ← Co

DATA BEFORE CONVERSION

FIG. 28

INK-JET IMAGE-FORMING METHOD AND IMAGE-FORMING APPARATUS

FIELD OF THE INVENTION

The present invention relates to a dot formation method in an ink-jet image-forming method, that is, a dot formation method at the time of making prints by using a printer of an ink-jet system, and also concerns an image-forming apparatus for forming images in accordance with such a method.

BACKGROUND OF THE INVENTION

In image-forming apparatuses of the ink-jet system (hereinafter, referred to as ink-jet printers), various studies have been made on improvements of the dot formation method in order to improve the image quality and to shorten the drying time.

For example, Japanese Laid-Open Patent Application No. 330086/1993 "Tokukaihei 5-330086 (published on Dec. 14, 1993)" (U.S. Pat No. 5,596,355) discloses a technique in which an image-forming process is carried out by using a slow-drying black ink that has high reproducibility in black color although it takes a long drying time and a quick-drying black ink that has only a thin printing density although it has a short drying time. In this technique, in the case when a color dot is formed adjacent to an area in which black dots are formed, the border area is formed by using the quick-drying black ink or superposing inks of CMY on each other, and the other areas are formed by using the slow-drying black ink.

This arrangement has achieved an improvement of the reproducibility in black color, and has made it possible to reduce bleeding occurring on the border between black dots and color dots.

Moreover, Japanese Laid-Open Patent Application No. 149036/1995 "Tokukaihei 7-149036 (published on Jun. 13, 1995)" discloses a technique in which black ink having low permeability to recording paper and CMY ink having high permeability thereto are used. FIGS. 29 and 30 disclose an example of dot formation using this technique. More specifically, in the case when a color dot area is formed adjacent to an area in which black dots are to be formed, the black dots within the black dot area are thinned, and instead of these, color dots are formed. Moreover, this example also shows that color dots are formed as a base of a black dot area so that black dots are superposed on the color dots.

This arrangement prevents bleeding occurring on the border between a black dot area and a color dot area, and also shortens the drying time of the black dots. Moreover, Japanese Laid-Open Patent Application No. 197831/1996 "Tokukaihei 8-197831 (published on Aug. 6, 1996)" also discloses a similar technique.

Moreover, Japanese Laid-Open Patent Application No. 336961/1996 "Tokukaihei 8-336961 (published on Dec. 24, 1996)" discloses a technique in which dots in a solid portion are thinned so as to shorten the drying time. This example also discloses a technique in which, upon thinning dots in the solid portion, the outline is printed as it is without thinning dots so as to prevent a shaggy printing (burr appearance) from spreading at the outline portion.

Here, in a separate manner from the above-mentioned improvements in the printing methods, many techniques have been proposed so as to shorten the drying time of printed objects by installing a drying means such as a heating device using a halogen lamp.

However, the following problem is caused by the technique disclosed in the above-mentioned Laid-Open Patent Application No. 330086/1993, upon forming an area having a great back dot density (hereinafter, referred to as a solid black area).

Since the solid black area is formed by using black ink of a slow-drying type having high black reproducibility in order to improve image quality, insufficiently dried black ink causes stains, set-off, etc. on the printed object. This is because there is a correlation between the black dot density and the drying time, with the result that a solid black area that has a high dot density and that also has an area exceeding a certain extent, for example, characters having not less than 10 point or lines and dots having not less than 0.5 point, needs a long drying time.

In particular, in an ink-jet printer using the facedown system in order to improve the operability, there are problems in which ink adheres to a transport roller, etc. that first comes into contact with the printed face immediately after the printing process and re-transferring of ink to the recording paper.

In contrast, in the case when black ink of a quick-drying type is used to form the solid black area, its poor reproducibility causes degradation in the image quality.

Moreover, in the techniques disclosed in Japanese Laid-Open Patent Applications No. 149036/1995 and No. 197831/1996, besides the above-mentioned problems, another problem arises in which a color dot, that is, a monocolor of yellow (Y), magenta (M) or cyan (C), mixedly exists in the border area within the black dot area, thereby causing degradation in the image quality of black color.

Furthermore, with respect to a method for shortening the drying time in the case when the black dot density is high, no method has been disclosed.

In the technique disclosed in Japanese Laid-Open Patent Applications No. 336961/1996 (Tokukaihei 8-336961), the thinning process of black dots causes problems of a reduction in the density and degradation in the image quality.

As described above, in the above-mentioned conventional techniques, those problems arise due to the fact that no consideration is given to the drying time of the solid black area in the image formation.

In the technique using a drying means, in addition to the necessity of a complicated apparatus construction, another problem arises in which there is an increase in the power consumption due to power to be consumed in the drying means.

SUMMARY OF THE INVENTION

The objective of the present invention is to provide an image-forming method and an image-forming apparatus of an ink-jet system which can omit the installation of, or reduce the scale of a drying means that has high power consumption and causes high costs of the apparatus, and which can also dry an area with high dot density while reducing degradation in the image quality.

In order to achieve the above-mentioned objective, an ink-jet image-forming method of an ink-jet system in accordance with the present invention in which dots are formed by using a slow-drying ink having a comparatively long drying time and a quick-drying ink having a comparatively short drying time so that the dots form an image is provided with an arrangement in which: the density of the dots in an image area within a predetermined range is discriminated based upon image data, and based upon the results of the discrimination, selection is made between slow-drying ink and quick-drying ink so as to form the dots.

In the above-mentioned method, upon forming the dots, the density of the dots in an image area within a predetermined range is discriminated based upon image data. Based upon the results of the discrimination, either the slow-drying ink or the quick-drying ink is selected, or both of them are selected, and the dots are formed by using the selected ink.

In general, the drying time of ink forming dots is influenced by the density of the dots at a position in which the dot is formed. Thus, as the drying time becomes longer, the above-mentioned problems arise. In contrast, when the quick-drying ink is used, it is possible to shorten the drying time. However, since the quick-drying ink generally has a low printing density and low color reproducibility, the application of only the quick-drying ink tends to cause degradation in the image quality of an printed image.

Here, in the above-mentioned method, the density of the dots is discriminated, and based upon the results of the discrimination, a judgment is made as to whether or not the period of the drying time raises any problem. Then, in accordance with the judgment, selection is made from the slow-drying ink and the quick-drying ink so as to form the dot; thus, it is possible to shorten the ink drying time and also to reduce degradation in the image.

In other words, the density of the dots is discriminated, and in the case when the results show that the period of the drying time raises any problem, ink is selected in a manner so as to use the quick-drying ink more; thus, it is possible to shorten the ink drying time. In contrast, in the case when the judgment shows that the period of the drying time raises no problem, ink is selected in such a manner that only the slow-drying ink is used or the slow-drying ink is used more; thus, it is possible to reduce degradation in the image quality of an image as a whole. Consequently, the above-mentioned method makes it possible to avoid an increase in the drying time, that is, a reduction in the printing speed, while maintaining high image quality by reducing degradation in the image quality of a printed image.

Moreover, in order to achieve the above-mentioned objective, the ink-jet image-forming apparatus of an ink-jet system of the present invention in which dot are formed by using a slow-drying ink having a comparatively long drying time and a quick-drying ink having a comparatively short drying time so that the dot form an image is provided with a calculation means which, upon forming the dot, calculates a dot area rate that represents the density of the dot formed within a predetermined area for the dots, and a discrimination means which, based upon the dot area rate, selects ink to be used from the slow-drying ink and the quick-drying ink.

In the above-mentioned arrangement, the dot area rate is calculated by the calculation method. Then, based upon the dot area rate, the discrimination means selects ink to be used for forming the dots from the slow-drying ink and the quick-drying ink.

Thus, the above-mentioned image-forming method can be carried out, and the following effects can be obtained. Consequently, a drying device, etc. used for shortening the drying time can be omitted, or the scale thereof can be reduced. In other words, while eliminating the necessity of delaying the printing speed or installing a device for drying the printed object in order to dry ink and the subsequent increase in the output, high image quality can be maintained. Therefore, it is possible to provide an inexpensive, small-size ink-jet image-forming apparatus which can achieve high image quality, high printing speeds, a simple apparatus structure and small power consumption.

Moreover, in the image-forming method and the image-forming apparatus of an ink-jet system of the present invention, the image areas are set in association with respective dots at the time of image formation, and the dot area rate representing the density of dots, formed in each image area, is calculated, and when the image area in question is a group of high-density dots that is a set of dots corresponding to the image areas in which the dot area rate becomes greater than a predetermined value, the slow-drying ink is superposed on the quick-drying ink so as to make printing.

In the above-mentioned method and arrangement, since the quick-drying ink forms the base of the slow-drying ink, it is possible to further improve the permeability of the slow-drying ink into recording paper, and consequently to further shorten the drying time of the ink. As a result, it is possible to avoid a reduction in the printing speed while maintaining high quality of an image to be formed.

Additionally, none of the above-mentioned conventional techniques disclose an arrangement in which, the image area in question has a dot area rate greater than a predetermined value, the slow-drying ink is superposed on the quick-drying ink so as to make printing.

For a fuller understanding of the nature and advantages of the invention, reference should be made to the ensuing detailed description taken in conjunction with the accompanying drawings.

BRIEF DESCRIPTION OF THE DRAWINGS

FIG. 13 is an explanatory drawing that shows data conversion in accordance with one embodiment, within a print data area of the line memory of FIG. 11, with one example of the data before the conversion being shown.

FIG. 14 is an explanatory drawing that shows data conversion in accordance with one embodiment, within a print data area of the line memory of FIG. 11, with one example of a black dot area rate of each cell being indicated.

FIG. 15 is an explanatory drawing that shows data conversion in accordance with one embodiment, within a print data area of the line memory of FIG. 11, with one example of the data after the conversion being shown.

FIG. 16 is an explanatory drawing that shows data conversion in accordance with another embodiment, within a print data area of the line memory of FIG. 11, with one example of the data before the conversion being shown.

FIG. 17 is an explanatory drawing that shows data conversion in accordance with another embodiment, within a print data area of the line memory of FIG. 11, with one example of a black dot area rate of each cell being indicated.

FIG. 21 is an explanatory drawing that shows data conversion in accordance with still another embodiment, within a print data area of the line memory of FIG. 11, with one example of the data before the conversion being shown.

FIG. 22 is an explanatory drawing that shows data conversion in accordance with still another embodiment, within a print data area of the line memory of FIG. 11, with one example of a black dot area rate of each cell being indicated.

FIG. 23 is an explanatory drawing that shows data conversion in accordance with still another embodiment, within a print data area of the line memory of FIG. 11, with one example of an outline bit map of a black area being indicated.

FIG. 24 is an explanatory drawing that shows data conversion in accordance with still another embodiment, within a print data area of the line memory of FIG. 11, with one example of the data after the conversion being shown.

FIG. 26 is an explanatory drawing that shows data conversion in accordance with still another embodiment, within a print data area of the line memory of FIG. 11, with one example of the data before the conversion being shown.

FIG. 28 is an explanatory drawing that shows data conversion in accordance with still another embodiment, within a print data area of the line memory of FIG. 11, with one example of the data after the conversion being shown.

DESCRIPTION OF THE EMBODIMENTS

Referring to FIGS. 1 through 15, the following description will discuss one embodiment of the present invention.

Figure 2:
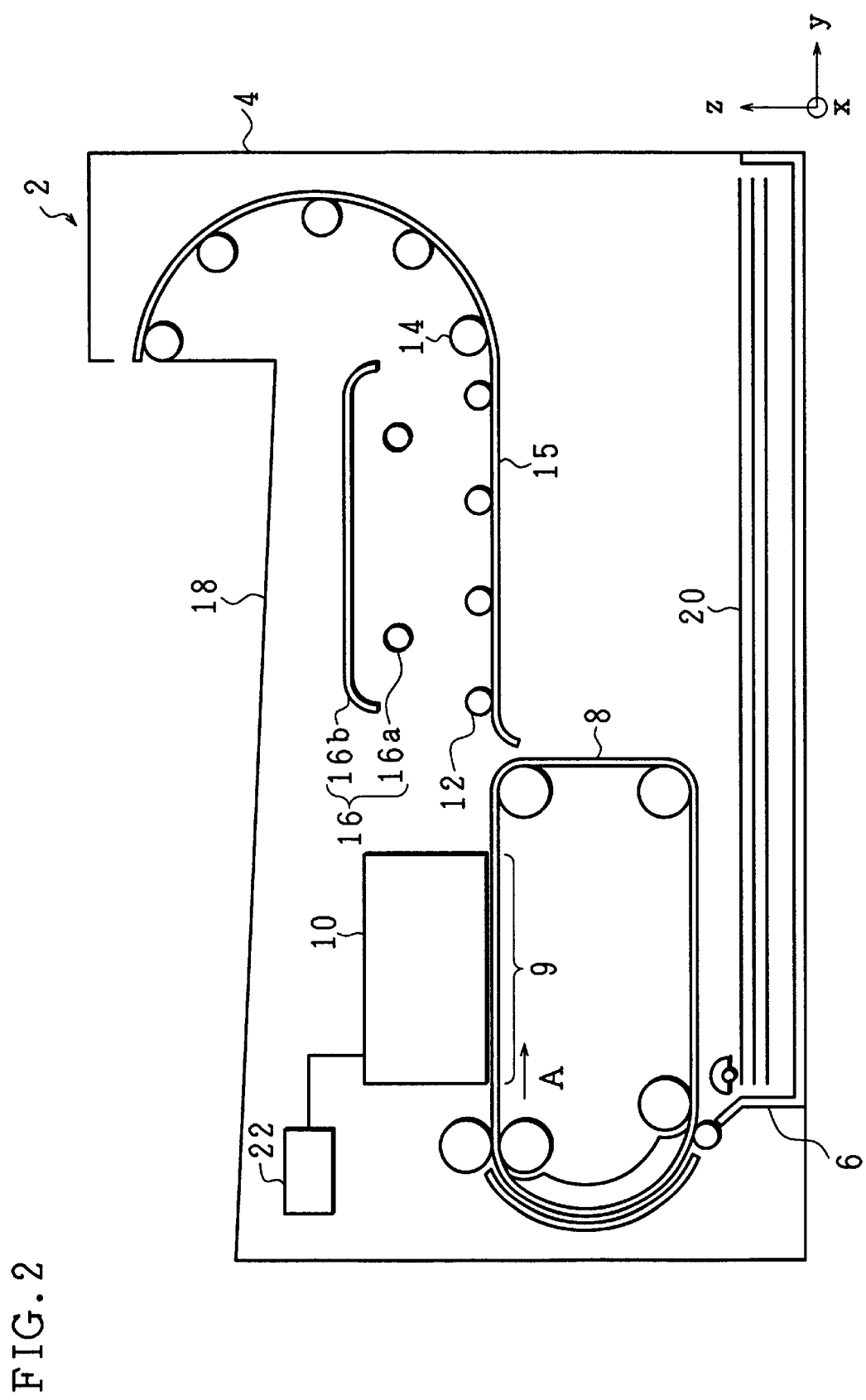
FIG. 2 is a side view that shows the inner structure of a color ink-jet printer, viewed from a side-face direction, in accordance with one embodiment of the present invention.

Referring to FIG. 2, an explanation will be given of an arrangement of a color ink-jet printer 2 to which a dot-formation method of an ink-jet system of the present embodiment is applied. FIG. 2 is an inner structural drawing that shows the arrangement of the color ink-jet printer 2 of the present embodiment, when viewed sideways.

The present color ink-jet printer 2 is provided with a paper-feed tray 6, a conveyor belt 8, a head 10, a star roller 12, a transport roller 14, a transport path 15 and a drying device 16 that are placed inside a cabinet 4, and a paper-receiving tray 18 is placed on the top of a cabinet 4. The color ink-jet printer is also provided with a control device 22 that controls various parts. Here, processes and operations in the color ink-jet printer 2, as will be described below, are controlled by the control device 22, unless otherwise specified.

When a printing operation is started, a sheet of recording paper 20, stored in the paper-feed tray 6, is first transported by the conveyor belt 8 to an image-forming position 9 at which the head 10 faces the conveyor belt 8. Then, at the time when the recording paper 20 passes through the image-forming position 9, ink is emitted from the head 10 based upon the position of the recording paper 20 and print data which will be described later so that an image is formed on the recording paper 20.

When it is further transported and passes through the transport path 15 in which the star roller 12 is placed, the recording paper 20 bearing ink is dried by the drying device 16 that is installed at a position facing the transport path 15. This drying device 16 is constituted by a halogen lamp 16a and a reflection plate 16b that is placed so as to irradiate the transport path 15 with light from the halogen lamp 16a; thus, these parts heat and effectively dry the surface of the recording paper 20 bearing ink.

The recording paper 20, which has been dried, is discharged by a transport roller 14 that is placed on the transport path 15 on the on-going side onto the paper-receiving tray 18 outside the cabinet 4 with its face down.

Here, in order to clarify the positional relationship between the construction of the head 10 explained by reference to FIG. 3 and the main body of the color ink-jet printer 2, directions are defined. As illustrated in the Figure, the direction of the normal to the recording paper 20 at the image-forming position 9 is defined as a z-direction, the transporting direction (the direction of arrow A in the Figure) of the recording paper 20 at the image-forming position 9 is defined as a y-direction, and a direction orthogonal to both the z- and y-directions is defined as an x-direction. These directions are supposed to point the common directions in FIGS. 2 and 3.

Next, referring to FIG. 3, an explanation will be given of the construction of the head 10. FIG. 3 is a plan view showing the layout of nozzles 11a when the head 10 is viewed from above (when viewed in an approaching direction from the head 10 toward the recording paper 20).

The head 10 is constituted by a black head block 10a and a color head block 10b. The first through third black heads $11K_1$, $11K_2$ and $11K_3$, constituting a black head 11K, are installed in the black head block 10a, and a cyan head 11C, a magenta head 11M and a yellow head 11Y, corresponding to respective colors of cyan (C), magenta (M) and yellow (Y), are installed in the color head block 10b.

Here, each of the heads $11K_1$, $11K_2$, $11K_3$, 11C, 11M and 11Y has, for example, 64 nozzles 11a for emitting the respective inks; thus, a resolution of 600 dpi is provided.

The amount of ink emission, the ink density and the process conditions of each of the blocks 10a and 10b are, for example, shown in Table 1. Moreover, with respect to the respective inks, for example, those having compositions shown in Table 2 are used.

TABLE 1

| Kind of Ink | Black | Yellow,Magenta,Cyan |
|---|---|---|
| Ink Amount of Emission | 30 pl | 10 pl |
| Dot Diameter | 90 μm | 70 μm |
| Print Density | 1.35 | 1.0 |
| Process Condition | 600DPI(42.3 μm pitch), Droplet Forming Frequency:12kPPS | |

TABLE 2

| | Unit | Bk. | | Unit | Mg. | Yel. | Cyan |
|---|---|---|---|---|---|---|---|
| Carbon Black | Wt % | 4 | Dye solution | Wt % | 31 | 47 | 35 |
| Latex Component | | 1 | Butyl carbitol | | 12 | 12 | 12 |
| Sulfolane | | 21 | Sulfolane | | 15 | 15 | 10 |
| 2-pyrrolidone | | 7 | N-acetyl ethanol | | 13 | 13 | 16 |
| Water | | 66.5 | Water | | 25.9 | 9.9 | 23.9 |
| Conditioner, etc. | | 0.5 | Conditioner, etc. | | 3.1 | 3.1 | 3.1 |
| Viscosity | mPa.s | 3.22 | Viscosity | mPa.s | 3.3 | 3.32 | 3.3 |
| Surface tension | mN/m | 44 | Surface tension | mN/m | 39 | 40 | 38.5 |
| pH | — | 8 | pH | — | 7 | 7 | 7 |

The head 10 is installed on a driving mechanism (not shown) so as to freely rock thereon in a head shifting direction (in the direction of arrow B in the Figure) that is a direction orthogonal to the A direction that is a paper transporting direction. Then, the ink emission from the nozzles 11a is turned on and off based upon print data, which will be described later, the position of the recording paper 20 and the position of the head 10 so that the above-mentioned image formation is carried out.

Next, an explanation will be given of the density of dots formed on the recording paper 20 by the above-mentioned head 10.

Here, the dot refers to a minimum unit of an image formed on the recording paper 200 by the emission of ink from the nozzle 11a. In other words, an area on the recording paper 200 that is subjected to each ink emission from one nozzle 11a (except that ink is superposed) is coincident with one dot. The value indicating the diameter (dot diameter) of the dot is referred to as the dot size.

Moreover, the dot formation position and the dot pitch are defined as follows: The dot formation position is defined as a position on which a dot can be formed, and the dot pitch is defined as the distance between the dot formation positions located closest to each other.

In the following description, an explanation will be given of a case in which dot formation positions are placed in a matrix format, and in which, with respect to each of the dot formation positions, the distances from the adjacent dot formation positions in the row and column directions are all the same.

In the present embodiment, it is assumed that the dot size of each dot is the same (the dot size is fixed). In this state, the area rate $S_o1$ (dot area rate) is defined based upon the following equation 1 as a value indicating a density of dots (dot density) within a predetermined area constituted by m rows ×n columns of dot formation positions.

$$\text{(Area rate } S_o1) = p0/(m \times n) \qquad \text{Equation 1}$$

Here, p0 indicates the number of dots formed within a predetermined area, that is, the number of dots actually formed in the dot formation positions within the predetermined area. Moreover, m represents the number of rows in the dot formation positions constituting the predetermined area, and n represents the number of columns in the dot formation positions constituting the predetermined area; therefore, m×n represents the number of the dot formation positions within the predetermined area. Hereinafter, the area rate $S_o1$ is appropriately represented by percentage.

FIGS. 4 to 7 show specific examples of the area rate $S_o1$. FIGS. 4 to 7 are plan views showing layouts of dots on the recording paper 20, which respectively show cases having the area rates $S_o1$ of 25%, 50%, 75% and 100%. In other words, FIGS. 4 to 7 respectively show cases in which dots are formed in ¼, ½, ¾ and all of the dot formation positions.

In the respective Figures, dots are represented by circles, while the dot formation positions are represented by mesh points, and the number of the dot formation positions is 5 rows×8 columns=40. Moreover, the dot size of each dot is set to an ideal dot size. The ideal dot size is represented by a dot pitch ×√2.

In these examples, in the case when the area rate $S_o1$ exceeds 50% (in the cases of FIGS. 6 and 7), the adjacent dots overlap each other.

With respect to the black dot area rate $S_K1$ (dot area rate) that focuses only on black dots, it is defined by equation 2 based upon the above-mentioned area rate $S_o1$. (Black dot area rate $S_K1)=p1/(m\times n)$ . . . Equation 2. Here, p1 indicates the number of black dots formed within a predetermined area, that is, the number of black dots actually formed in the dot formation positions within the predetermined area.

As described earlier, when slow-drying black ink is used so as to improve picture quality, the ink drying time becomes longer in an area having a high black dot density, that is, in an area having a high black dot area rate $S_K1$. In particular, in the case when the black dot area rate $S_K1$ exceeds 50%, causing the adjacent dots to overlap each other, the time required for the ink to dry becomes extremely long. Since ink tends to be absorbed while developing in the direction (that is, in the plane direction) of paper fibers constituting the recording paper 20 rather than in the thickness direction of the recording paper 20, the overlapped dots give serious influences on the drying time.

Figure 8:
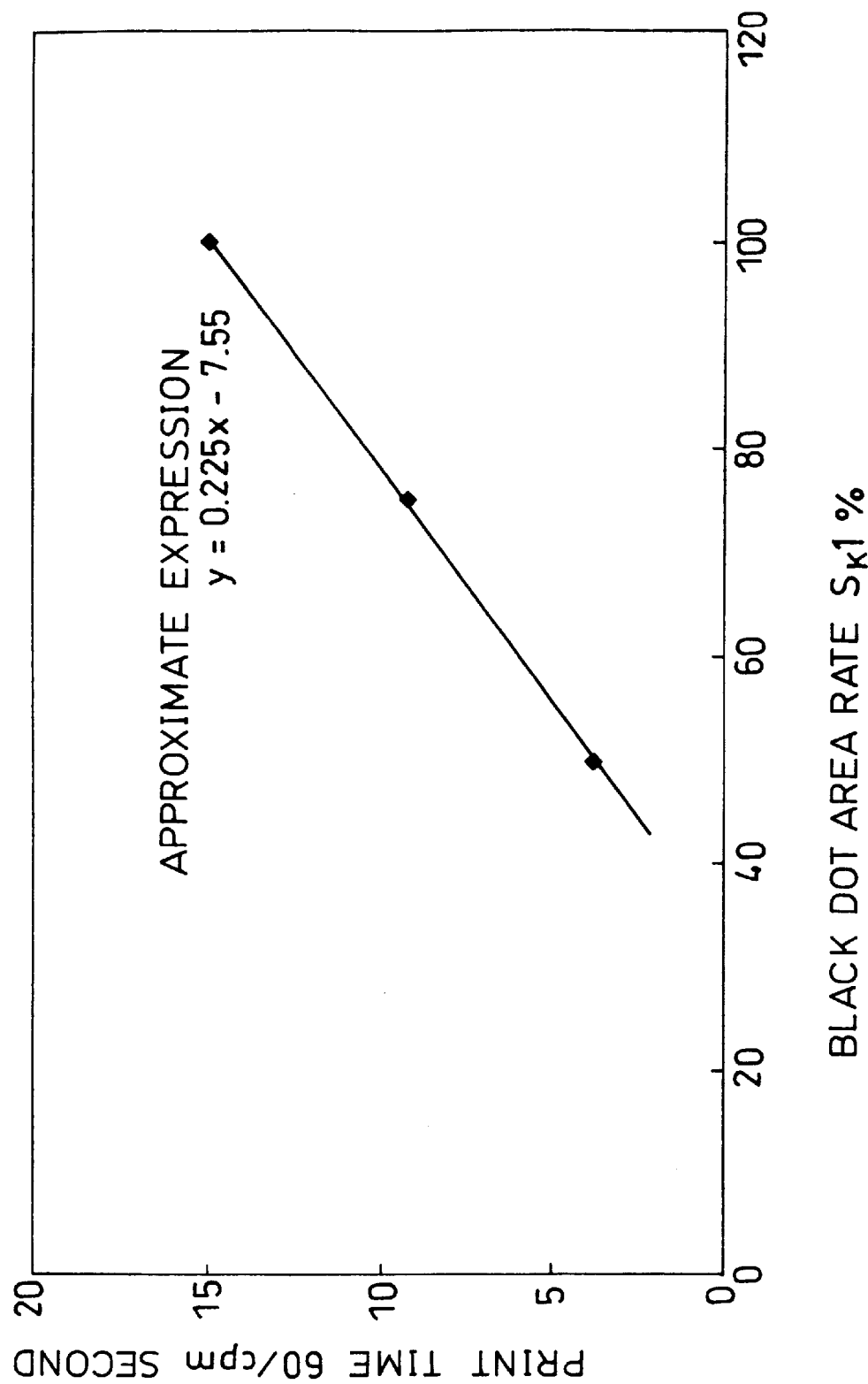
FIG. 8 is a graph that shows the relationship between the black dot area rate and the printing time.
Figure 9:
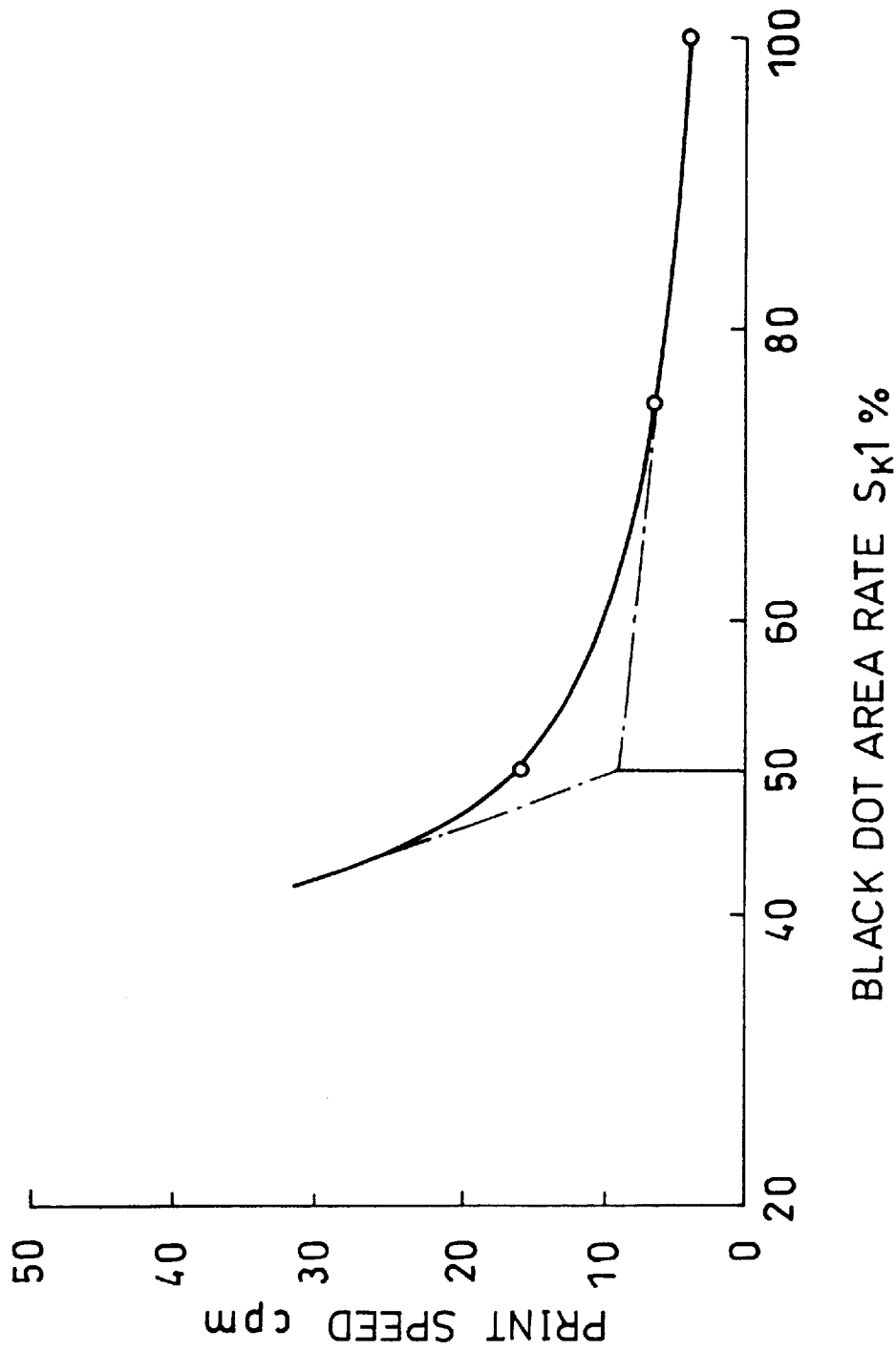
FIG. 9 is a graph that shows the relationship between the black dot area rate and the printing speed.

This fact is clearly shown by data in FIGS. 8 and 9. FIGS. 8 and 9 are graphs showing the relationship between the print time and the print speed in association with the black dot area rate $S_K1$.

Figure 5:
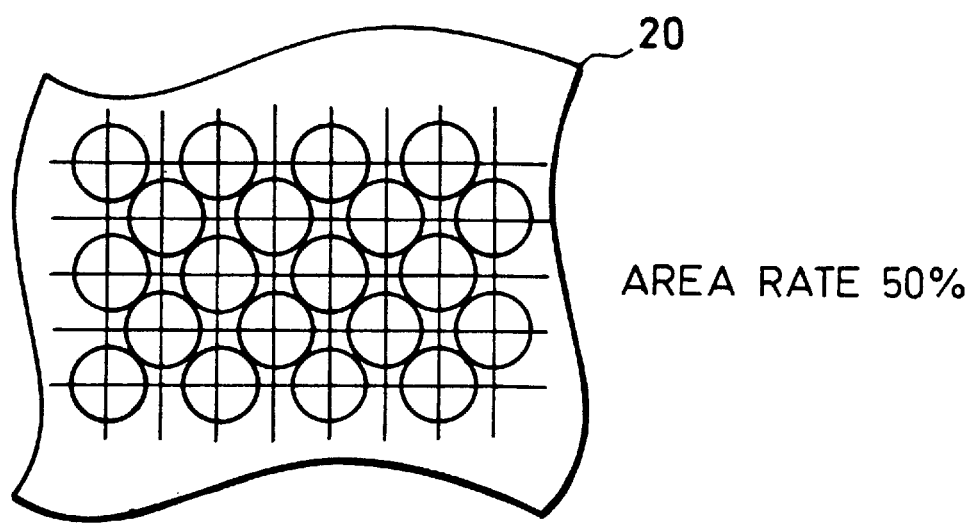
FIG. 5 is a plan view that shows an arrangement of dots on recording paper, which has an area rate of 50%.
Figure 6:
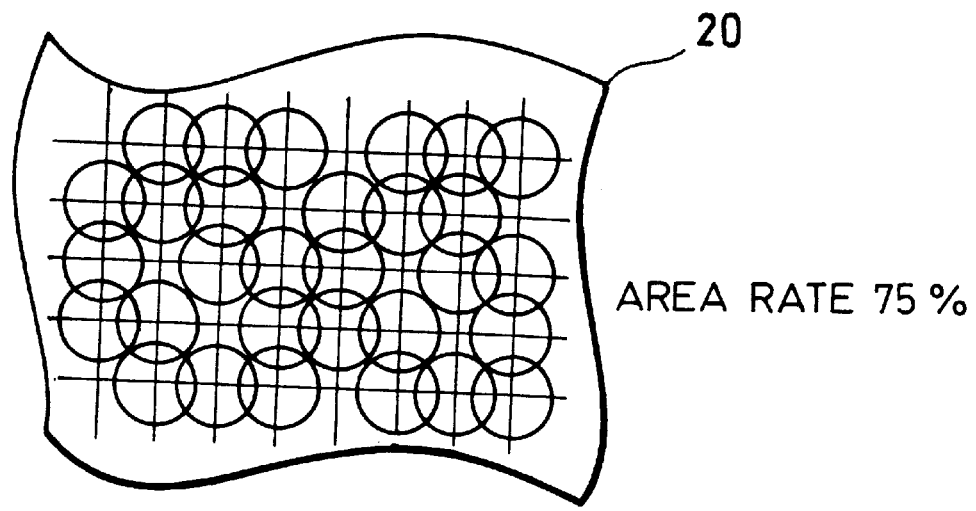
FIG. 6 is a plan view that shows an arrangement of dots on recording paper, which has an area rate of 75%.
Figure 7:
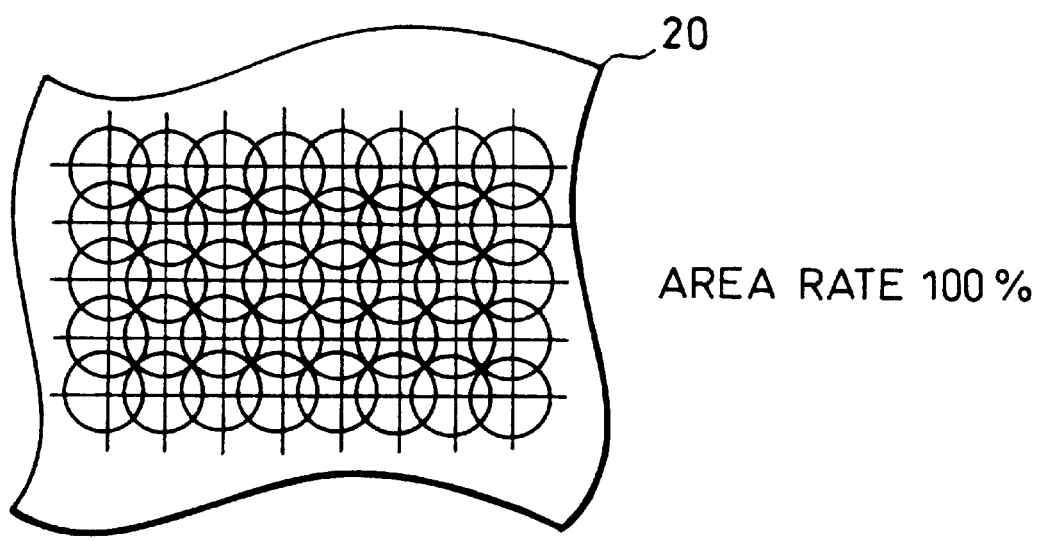
FIG. 7 is a plan view that shows an arrangement of dots on recording paper, which has an area rate of 100%.

The print times of FIG. 8 indicate periods of print time (actual measured values) in the case when black dots are formed evenly with slow-drying ink so as to set the black dot area rate $S_K1$ to 50, 75 and 100% (where the black dots are formed as shown in FIGS. 5, 6 and 7). Here, the print time is represented by time (seconds) required for one sheet of the recording paper 20 of A4 size to be printed, and set based upon the ink drying time.

Moreover, the print speed of FIG. 9 indicates the number of printed sheets of the recording paper 20 of A4 size per minute, and is obtained by taking an inverse number of the print time obtained as described above.

Here, from the broken line graph obtained by a broken-line approximation of the curve in the graph of FIG. 9, it is found that when the black dot area rate $S_K1$ exceeds 50%, the print speed enters an area indicating the lowest value. Therefore, in order to shorten the drying time of black dots and maintain the print speed high, it is preferable to limit the black dot area rate $S_K1$ formed by slow-drying ink to not more than 50%.

Next, an explanation will be given of print data (image information) for forming an image by using dots.

Figure 10:
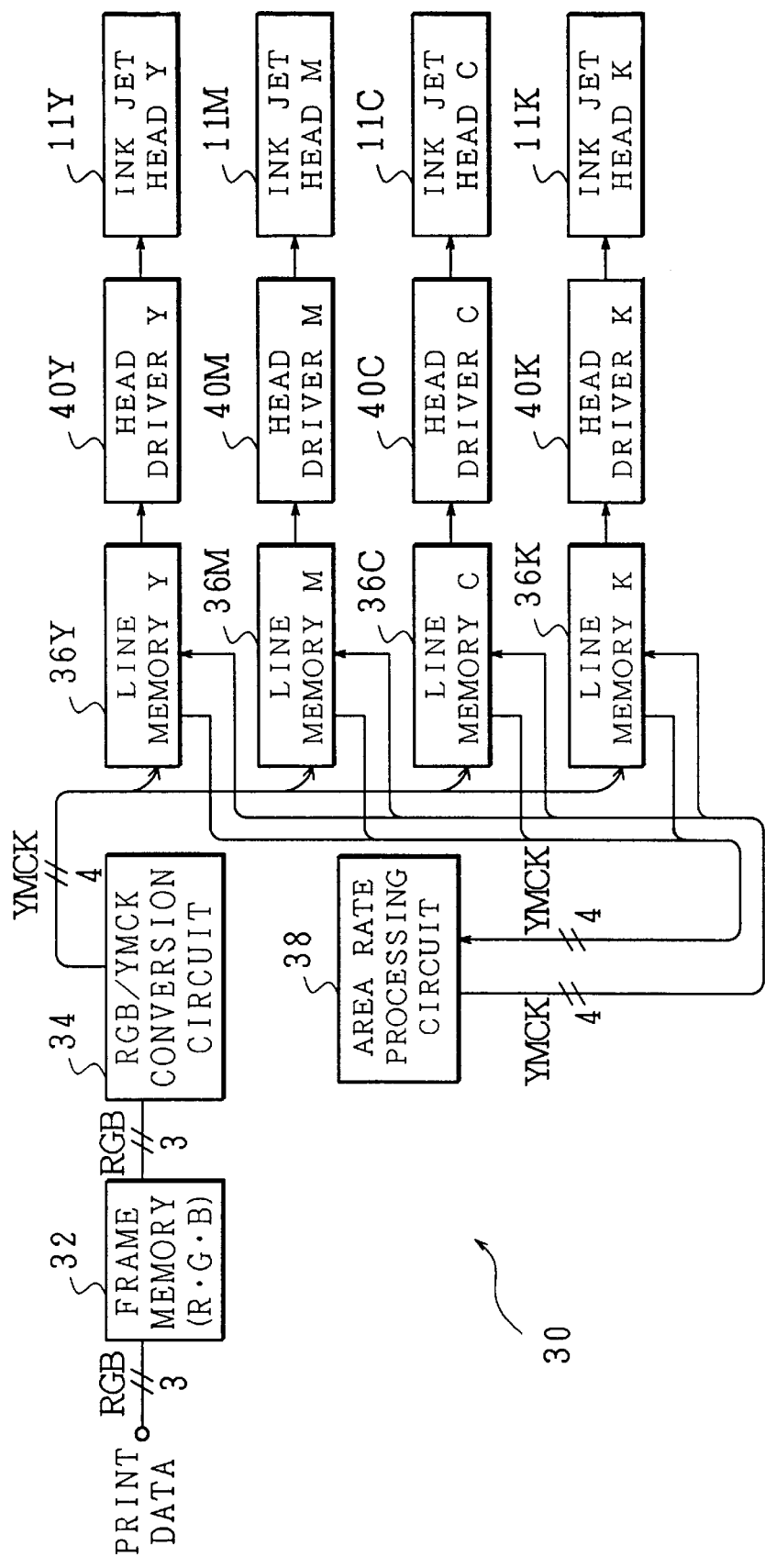
FIG. 10 is a block diagram that shows a data processing circuit of print data in accordance with one embodiment of the present invention.

First, referring to FIG. 10, an explanation will be given of the flow of print data. FIG. 10 is a block diagram that shows a data processing circuit 30 for print data. The data processing circuit 30 is installed in, for example, a control device 22. Here, in FIG. 10, R, G, B and Y, M, C, K represent respective print data (data of respective colors) of red, green, blue and yellow, magenta, cyan, black. Here, the FIG. "3" or "4" added together with "//" to lines connecting the blocks represents the number of data (the number of data lines) at the corresponding portion.

RGB-based print data are converted to YMCK-based print data by an RGB/YMCK conversion circuit 34 through a frame memory 32. Then, these are inputted to line memories 36Y, 36M, 36C and 36K corresponding to the data of respective colors (image data) Here, if the original print data are YMCK-based data, no RGB/YMCK conversion circuit 34 is required.

The data of respective colors, inputted to the line memories 36Y, 36M, 36C and 36K, are successively sent to an area-rate processing circuit 38 where the black dot area rate $S_K1$ is calculated. Based upon the black dot area rate $S_K1$, discrimination is made as to whether or not a data conversion is made. In other words, the area-rate processing circuit 38 has a function as a calculation means for calculating the black dot area rate $S_K1$, and also has a function as a discrimination means for discriminating whether or not the data conversion is required. Then, ink that is to be used in forming dots is determined depending on the presence or absence of the data conversion. Additionally, detailed descriptions of the calculations for the black dot area rate $S_K1$, the discrimination as to the data conversion, and the data conversion will be given later.

The data of respective colors, appropriately converted as described above, are again inputted to the respective line memories 36Y, 36M, 36C and 36K. The data of respective colors, again inputted from the area-rate processing circuit 38 to the respective line memories 36Y, 36M, 36C and 36K, are inputted to the corresponding head drivers 40Y, 40M, 40C and 40K. Based upon the inputted print data, these head drivers 40Y, 40M, 40C and 40K drive respective heads, that is, a yellow head 11Y, a magenta head 11M, a cyan head 11C and a black head 11K (see FIG. 3). Thus, dots are formed on the recording paper 20 by the respective heads 11Y, 11M, 11C and 11K.

Figure 11:
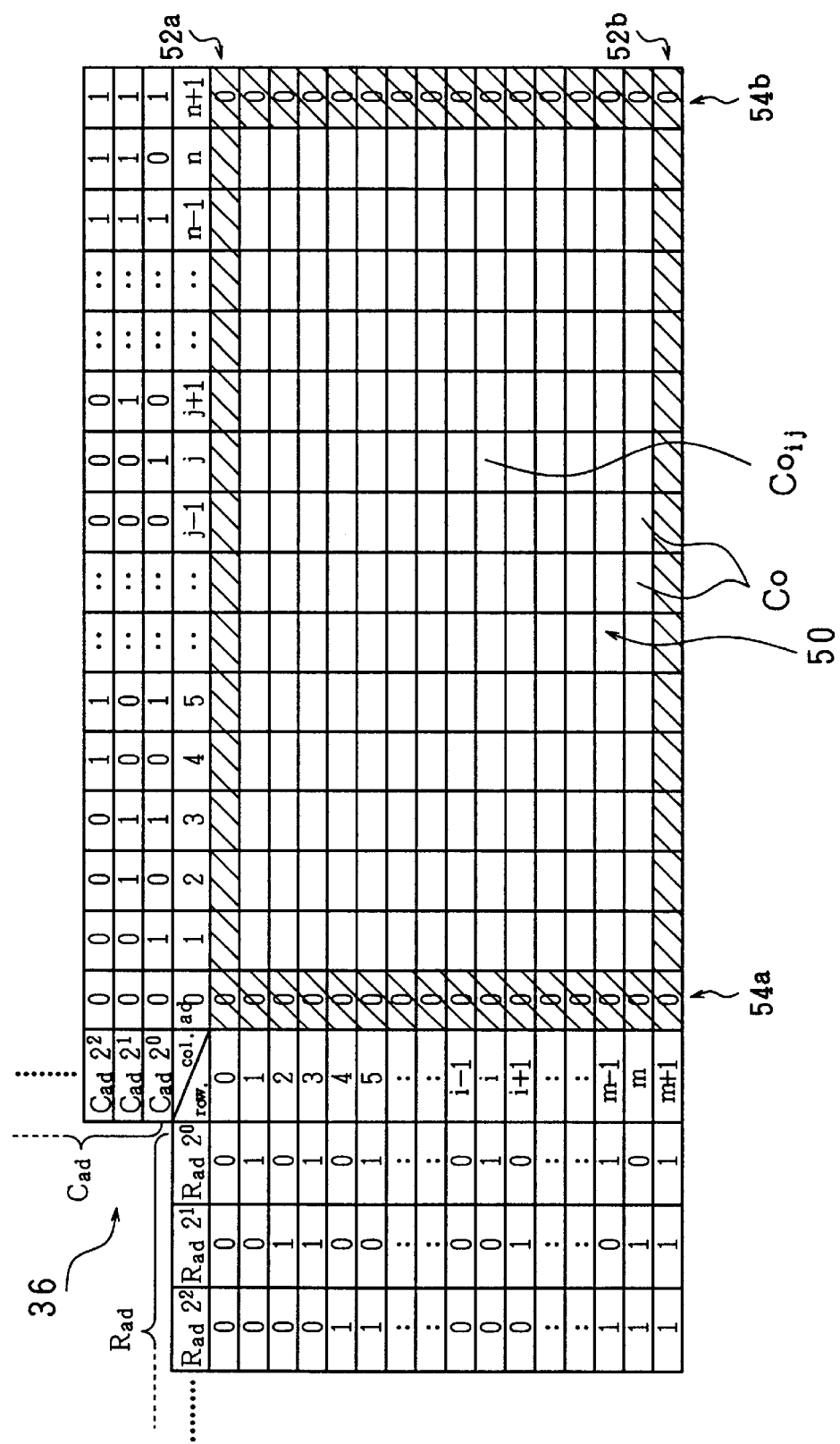
FIG. 11 is an explanatory drawing that shows a memory structure of a line memory in accordance with one embodiment of the present invention.

Referring to FIG. 11, an explanation will be given of the respective line memories 36Y, 36M, 36C and 36K. Here, the respective line memories 36Y, 36M, 36C and 36K have the same memory construction; therefore, for convenience of explanation, these are superposed as one line memory 36, which will be explained. In other words, in the respective line memories 36Y, 36M, 36C and 36K, a cell Co that has the same address (which will be described later) is considered as one unit, and it is assumed that information of the data of respective colors is stored in this cell Co. FIG. 11 is an explanatory drawing that shows the memory construction of the line memory 36.

The line memory 36 is constituted by a print data area (recording image area) 50, first and second correcting data areas 52a and 52b, first and second dummy data areas 54a and 54b, and addresses that are assigned to the row and column of each area.

The print data area 50 is formed by a memory map consisting of m rows×n columns of cells Co. The respective cells Co constituting the print data area 50 and the dot formation positions have a one-to-one correspondence, and data D, that is, information of a dot to be formed on each dot formation position, is stored in each of the cells Co.

The data D has the value of either 1 or 0 depending on whether or not it forms a dot. More specifically, with respect to data $D_{ij}$ stored in a cell $Co_{ij}$ that is a cell located at i-row, j-column, in the case when a dot is formed at the dot formation position corresponding to the cell $Co_{ij}$, data $D_{ij}=1$ is given, and in the case when a dot is not formed at the dot formation position corresponding to the cell $Co_{ij}$, data $D_{ij}=0$ is given. Here, the subscripts "ij" refer to i-row, j-column, and in the following description, the subscripts are attached only when a position on the matrix is specified. Moreover, data D is used when data is explained generally without discriminating data of respective colors; and in the case when data D of the respective colors are discriminated, descriptions data Y, M, C and K are respectively used.

Figure 3:
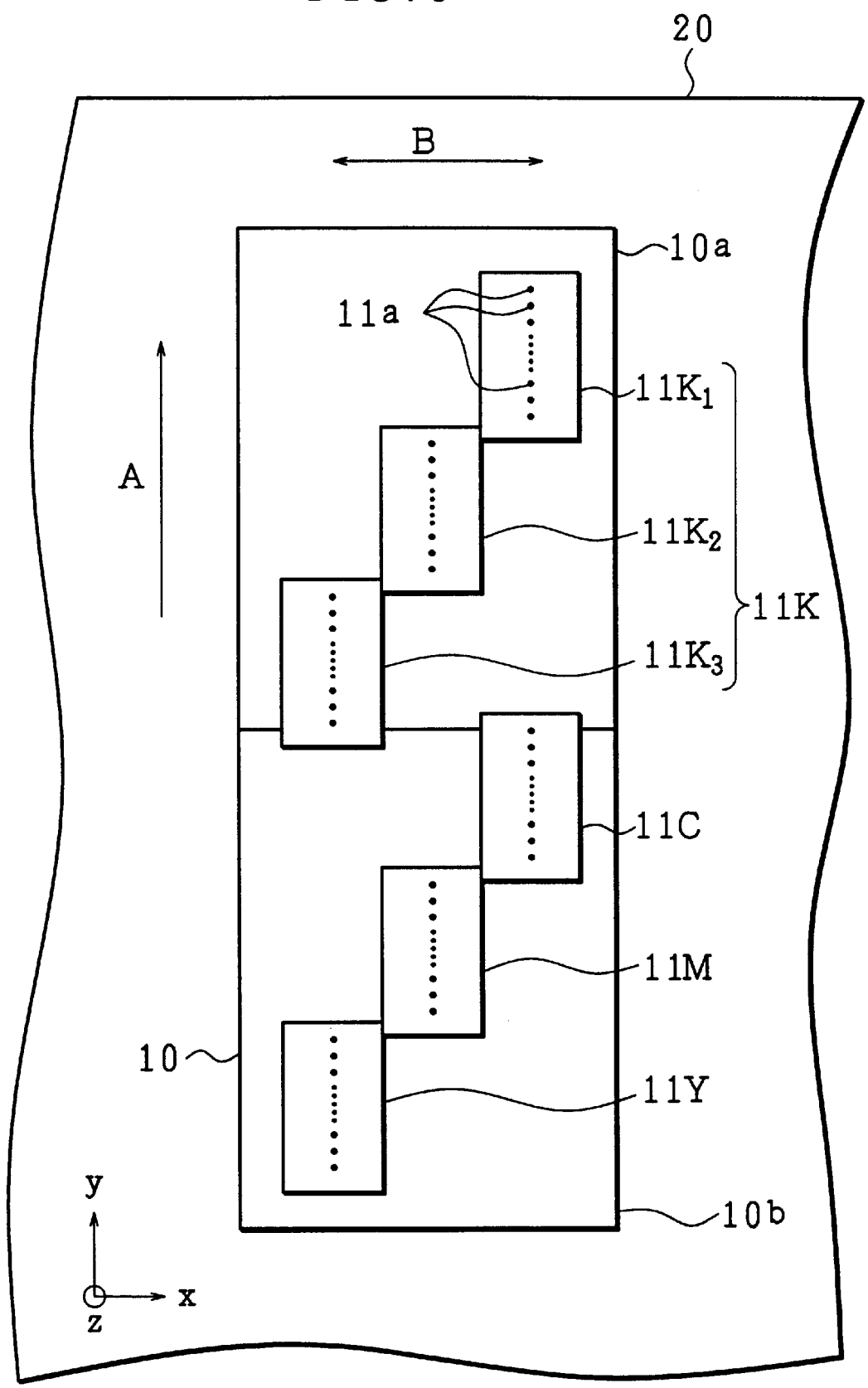
FIG. 3 is a plan view that shows the layout of nozzles with the head of FIG. 2 being viewed from above.
Figure 4:
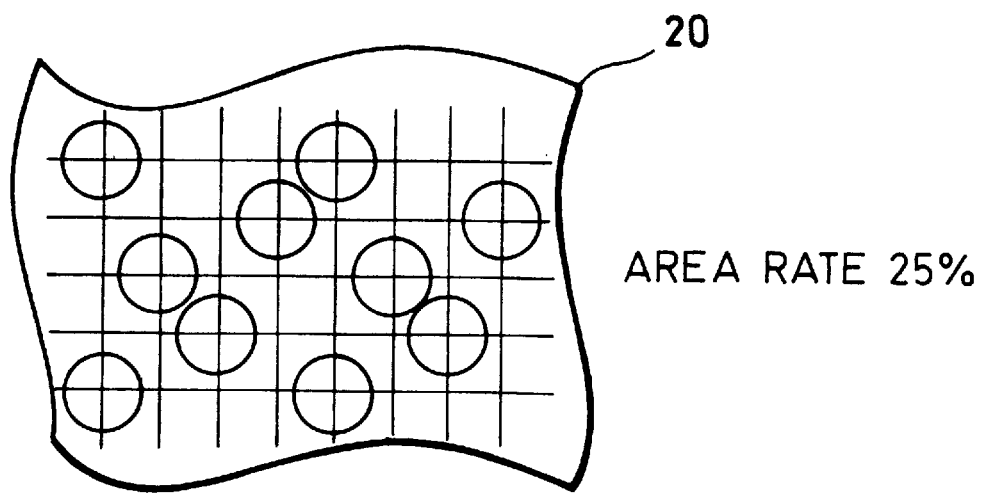
FIG. 4 is a plan view that shows an arrangement of dots on recording paper, which has an area rate of 25%.

Here, the row direction and column direction of the print data area 50 respectively correspond to the main scanning direction (the head shifting direction, that is, B-direction in FIG. 3) and sub scanning direction (the paper transporting direction, that is, A-direction in FIG. 3).

Moreover, the print data area 50 is arranged so that the print data is divided in the sub scanning direction, and successively stored. In other words, the cells Co contained in one line of the print data area 50 are allowed to store all data D corresponding to one row in the main scanning direction (in the width direction of the recording paper 20 (see FIG. 3)), and the cells Co contained in one column of the print data area 50 are allowed to store data D corresponding to one column, divided in the sub scanning direction.

Furthermore, with respect to the cells Co of m rows×n columns within the print data area 50, row Nos. (channel, row) from 1 to m are given to the respective rows from the first to the last, and column Nos. (col.) from 1 to n are given to the respective columns from the first to the last.

First and second correction data areas 52a and 52b and first and second dummy data areas 54a and 54b are data areas corresponding to the peripheral portion of a portion corresponding to the print data area 50 in an actual printed image. These areas store data D used for calculating the black dot area rate $S_K1$ which will be described later in the outermost circumferential portion of the print data area 50.

First, the first and second correction data areas 52a and 52b are constituted by cells Co forming a row (on the upper side in the Figure) immediately before the leading row and a row (on the lower side in the Figure) immediately after the last row of the print data area 50, and respectively have row Nos. 0 and m+1. Thus, the first and second correction data areas 52a and 52b respectively store data of row=m (channel 1 correction data) that has been stored in the print data area 50 immediately before and data of row=1 (channel m correction data) that are to be stored in the print data area 50 immediately after.

Moreover, the first and second dummy data areas 54a and 54b are constituted by cells Co forming a column (on the left side in the Figure) immediately before the leading column and a column (on the right side in the Figure) immediately after the last column of the print data area 50, and respectively have column Nos. 0 and n+1. Since the first and second dummy data areas 54a and 54b correspond to areas on both edges of the recording paper 20 (see FIG. 3) where no images are formed (areas having no print data, margin portions), data D=0 is stored in all the cells Co.

Addresses $R_{ad}$ and addresses $C_{ad}$ are respectively assigned to respective rows and columns constituting the above-mentioned respective areas. These addresses $R_{ad}$ and addresses $C_{ad}$ represent the respective row Nos. and column Nos. by using binary numbers. Here, for convenience of explanation, the addresses $R_{ad}$ and the addresses $C_{ad}$ are respectively indicated as addresses $R_{ad}2^0$, $R_{ad}2^1$ . . . , and addresses $C_{ad}2^0$, $C_{ad}2^1$ . . . , from the lower bit in succession (first digit, second digit, . . . ).

Referring to FIGS. 12 through 15, an explanation will be given of the data conversion of print data on the line memory 36 carried out by the area-rate processing circuit 38 (see FIG. 10).

As described earlier, in the case when all the black dots in areas where the black dot area rate $S_K1$ exceeds 50% are formed by using slow-drying black ink (slow-drying type ink), there is a serious reduction in the printing speed. For this reason, in such areas where the black dot area rate $S_K1$ exceeds 50%, quick-drying black ink (quick-drying type ink) is partially applied. In the following description, those black dots formed by the slow-drying black ink are referred to as first dots, and those black dots formed by the quick-drying black ink are referred to as second dots.

In the above-mentioned description, the black dot area rate $S_K1$ has been defined (see FIGS. 4 through 7) as a value indicating the degree of black dot density (the degree of solid black) when black dots are formed evenly all over a predetermined area constituted by dot formation positions of m rows×n columns. In an actual printed image, the black dot density is different depending on portions of the image; therefore, the black dot area rate $S_K1$ is further set as described below.

In the case when attention is focused on a certain dot formation position, if a black dot is formed on the dot formation position (hereinafter, referred to as a target position), the ink drying time of the black dot depends on how many black dots are located in the peripheral area (adjacent areas) of the dot formation position. Therefore, the black dot area rate $S_K1$ of an adjacent area (a target dot area, an image area) having 3 rows×3 columns with the target position located in the center is defined as a black dot area rate $S_K1$ with respect to the target position.

Figure 12:
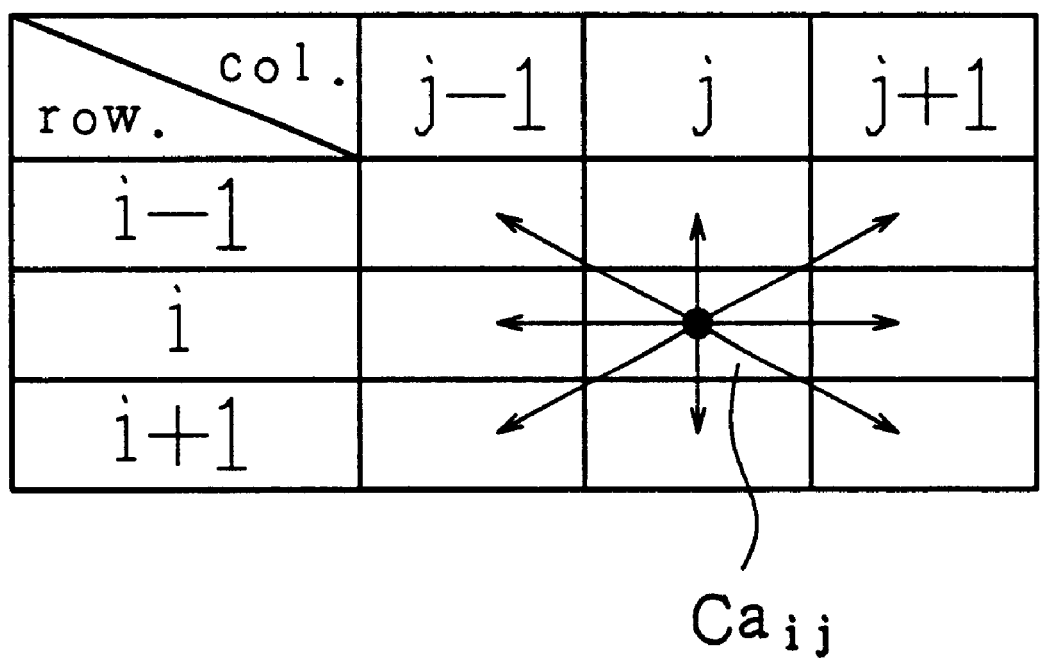
FIG. 12 is an explanatory drawing that shows one portion corresponding to a target pixel in a print data area of the line memory of FIG. 11.

Referring to FIG. 12 an explanation will be given of a method for finding the black dot area rate $S_K1$ of a target position that has been set as described above. FIG. 12 is an explanatory drawing that shows a portion (a target cell area) corresponding to the target dot area in the print data area 50 (see FIG. 11) of the line memory 36. Here, the dot formation positions and the cells Co have a one-to-one correspondence; therefore, in the following description, the cell Co corresponding to the target position is referred to as the target cell Ca, and the area of cells Co corresponding to dot formation positions constituting the target dot area is referred to as the target cell area.

As illustrated in FIG. 12, supposing that a cell $Co_{ij}$ is a target cell $Ca_{ij}$, cells Co, which belong to a (i−1), i, or (i+1) row, and also belong to a (j−1), j, or (j+1), constitute a target cell area. Therefore, it is said that the target cell area forms 3 rows×3 columns filter in the print data area 50.

With respect to the black dot, since only data $K_{ij}$ of 0 or 1 indicating whether or not a black dot is formed is written in the target cell $Ca_{ij}$, data D of the target cell area is required in order to find the black dot area rate $S_K1$. In other words, within the nine cells Co that consist of 3 rows×3 columns and that constitute the target cell area, the number of cells whose black dot data K is 1 is counted, and the value is divided by 9 so that the black dot area rate $S_K1$ is found.

Here, in the following description, when the black dot data K is not zero, the corresponding data K is referred to as black data.

More specifically, in the cells Co within the target cell area with respect to the target cell $Ca_{ij}$, when the number of cells having black data is X, the black dot area rate $S_K1$ of the target cell $Ca_{ij}$ is represented by X/9.

Referring to FIGS. 13 to 15, an explanation will be given of a method for determining black dots to be formed based upon the black dot area rate $S_K1$ obtained as described above. FIG. 13 through FIG. 15 are explanatory drawings that show data conversion within the print data area 50 of the line memory 36; and FIG. 13 shows data D prior to conversion, FIG. 14 shows the black dot area rate $S_K1$ for each cell Co, and FIG. 15 shows data D after conversion.

Here, in FIGS. 13 through 15, in the case of 1 of data Y, M, C and K, those data are respectively denoted as "Y", "M", "C" and "K", and in the case of 0 of data Y, M, C and K, no donation is given. Moreover, it is supposed that data D of the cells Co adjacent to the area shown in Figure are all zero.

First, within the print data area 50 having the data D shown in FIG. 13, with respect to all cells Co having black data, the black dot area rate $S_K1$ of each of the cells is successively found. As a result, FIG. 14 shows the dot area rate $S_K1$ of each of the cells Co. Here, the black dot area rate $S_K1$ is not stored in each cell Co; however, for convenience of explanation, in FIG. 14, the black dot area rate $S_K1$ corresponding to each cell Co is displayed.

As described above, when the black dot area rate $S_K1$ exceeds 50% (that is, not less than 5/9), there is an extreme drop in the print speed; therefore, the fact that the black dot area rate $S_K1$ exceeds 50% is used as a condition under which conversion is made (data conversion) so as to use the second black dot in place of the first black dot with respect to the data D of the cells Co (condition 1).

Here, suppose that among cells (group of high density dots) having the black dot area rate $S_K1$ exceeding 50%, those cells Co that are actually to be data-converted so as to use the second black dot are alternately placed in the row direction and the column direction. In this case, for example, those cells, which provide 1 as the exclusive OR of the address $R_{ad}2^0$ that is the lowest row address bit of the cells Co and the address $C_{ad}2^0$ that is the lowest column address bit thereof, are set to be target cells for the data conversion (condition 2). In FIGS. 13 to 15, those cells Co that have black dot data K prior to conversion and that also provide 1 as the exclusive OR are indicated by slanting lines.

With this arrangement, in the case when cells Co whose black dot area rate $S_K1$ exceeds 50% are located adjacent with each other in the row direction and the column direction, those cells Co having data K for forming the first dot (hereinafter, referred to as the first black data) and those cells Co having data K for forming the second dot (hereinafter, referred to as the second black data) are alternately arranged.

Moreover, with respect to the cells Co having the black data at a border (border portion) to a color area (where any of data Y, M and C is not "zero"), in order to prevent black dots spreading into the color area, even when the black dot area rate $S_K1$ is not more than 50% the data conversion is carried out if the above-mentioned condition 2 is satisfied. In other words, in the border to a color area, those cells Co having the black data are set as cells Co that are to be data-converted (condition 3).

Here, in this case, the second dot is formed by overlapping inks of respective colors (color ink). Therefore, the values stored in the cells Co that have been subjected to the data conversion to the second black data are all "1" with respect to data Y, M and C, and "0" with respect to data K. Table 3 shows the relationship between data D prior to the conversion and data D after the conversion in the data conversion.

TABLE 3

| Data before conversion | Data after conversion | | | |
|---|---|---|---|---|
| K | Y | M | C | K |
| 0 | 0 | 0 | 0 | 0 |
| 1 | 1 | 1 | 1 | 0 |

Moreover, FIG. 15 shows the results of the above-mentioned data conversion. As clearly seen from this Figure, as a result of the alternate arrangement, in an area having continuous high black dot area rates, only five of the first black dots are formed within the 3×3 dots at most; thus, the black dot area rate is restricted to not more than 5/9 and the second black dots account for the rest of the black dot area rate. Although 5/9 is greater than 50%, it is close to 50%, and it is possible to realize a virtually optimal ink distribution by using a simple dot arrangement.

Figure 1:
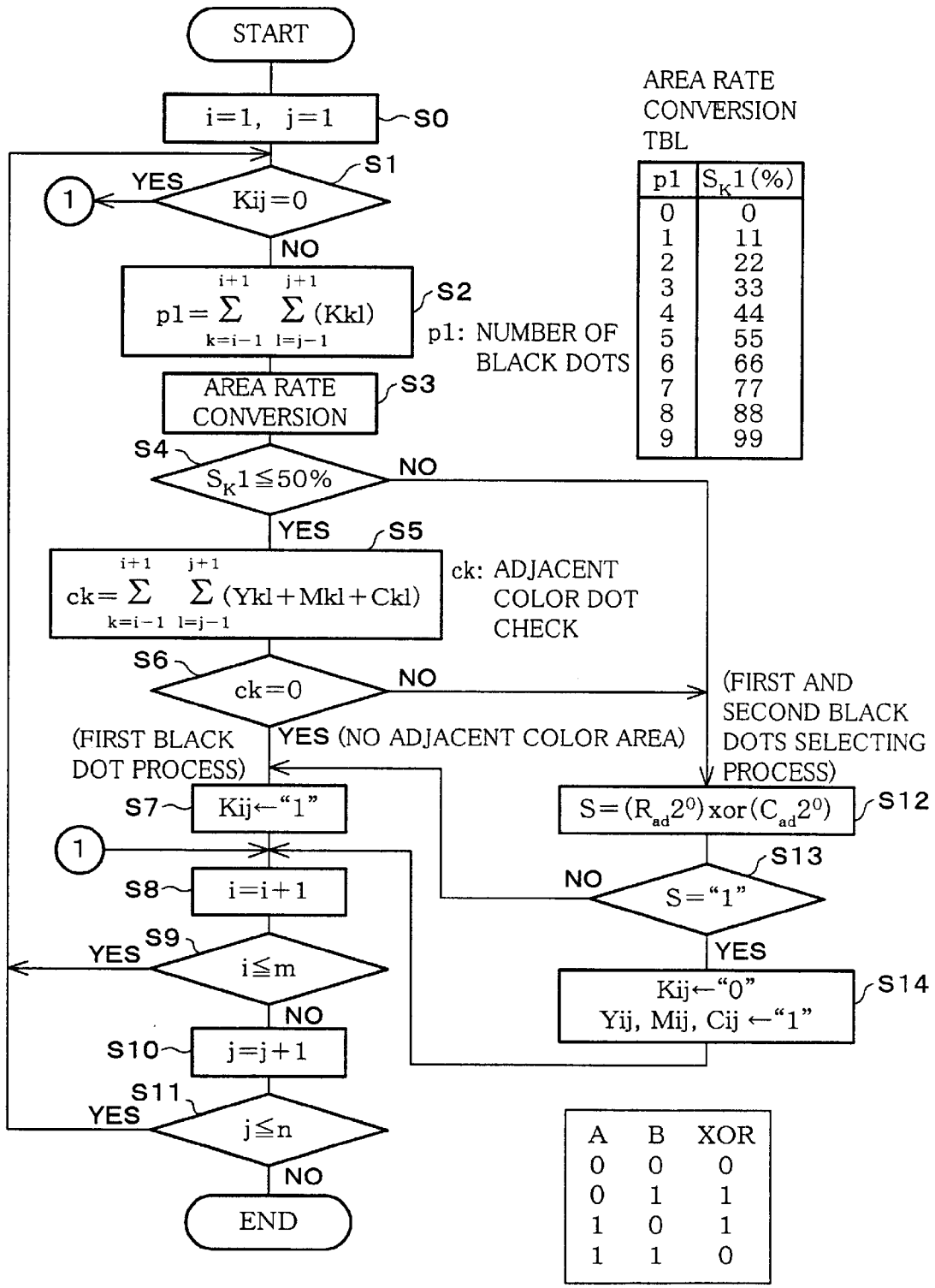
FIG. 1 is a flow chart that shows data processing in accordance with one embodiment of the present invention.

Referring to a flow chart of FIG. 1, an explanation will be given of the above-mentioned processes. FIG. 1 is a flow chart that shows the data process in accordance with the present embodiment. In the process shown in FIG. 1, the respective cells Co in the first row are successively taken as the target cell Ca, and the dot states of the target cell Ca (the black dot area rate $S_K1$ and dot colors formed by the adjacent cells Co) are found, and these processes are repeated up to the n-th row.

Here, for convenience of explanation, the data D (see FIG. 18 that will be described later) after conversion is stored in a separate manner from the data D (see FIG. 16 that will be described later) prior to the conversion, and it is supposed that the data D prior to the conversion used in the following respective steps is not changed.

First, in step S0, the target cell $Ca_{ij}$ is set at (i, j)=(1, 1) as an initial value. Then, at step S1, a judgment is made as to whether or not the target cell $Ca_{ij}$ has the black data. Here, in the case when the target cell $Ca_{ij}$ has the black data (data $K_{ij}=1$), the sequence proceeds to step S2, and in the case when it has no black data ($K_{ij}=0$), the sequence proceeds to step S8.

At step S2, those cells having the black data (data K=1) within the target cell area are counted by carrying out a process using the filter of 3 rows×3 columns, thereby defining the resulting value as black dot number p1.

Here, the target cell area is fixed to 3 rows×3 columns; therefore, in the case when the black dot area rate $S_K1$ is actually found from the black dot number p1, the area rate conversion table TBL, which is a table representing the relationship between the black dot number p1 and the black dot area rate $S_K1$, can be used to find the black dot area rate $S_K1$ without carrying out a dividing process, thereby making it possible to greatly shorten the time required for the operation process for finding the black dot area rate $S_K1$. This conversion is carried out at step S3. Here, the number of black dots B may be directly used for discrimination at step S4.

Then, at step S4, a judgment is made with respect to the black dot area rate $S_K1$ of the target cell $Ca_{ij}$. At step S4, if the black dot area rate $S_K1$ is not more than 50%, then the sequence proceeds to step S5.

At step S5, a check is made to see if there are any color dots in the target cell area (cells Co of 3 rows×3 columns) formed around the target cell $Ca_{ij}$ as the center. More specifically, the addition of the data Y, M and C within the target cell area is substituted in an adjacent color dot check ck. Therefore, in the case when any color dots are present, the adjacent color dot check satisfies ck≧1, and in the case when no color dots are present, the adjacent color dot check satisfies ck=0.

Then, at step S6, a judgment is made with respect to the adjacent dot check ck found in step S5. Here, in the case when no data D for forming color dots is present within the target cell area, that is, in the case of ck=0, the first black data (data $K_{ij}=1$) is applied to the data $D_{ij}$ of the target cell $Ca_{ij}$ at step S7 (no data conversion is made).

Here, in the case when the black dot area rate $S_K1$ exceeds 50% at step S4, or in the case when data D forming color dots is present at step S6, an exclusive OR is found between the address $R_{ad}2^0$ and the address $C_{ad}2^0$, and the value is set as the exclusive OR S at step S12. Then, at step S13, a judgment is made with respect to the exclusive OR S, and in the case when the exclusive OR S is zero, the sequence proceeds to S7, and the first black data (data $K_{ij}=1$) is applied to the data $D_{ij}$ of the target cell $Ca_{ij}$ at step S7 (no data conversion is made).

In the case when the exclusive OR S is 1 in step 13, the second black data (data $Y_{ij} \cdot M_{ij} \cdot C_{ij}=1$, data $K_{ij}=0$) is applied to the target cell $Ca_{ij}$ at step S14 (data conversion is made).

When the data $D_{ij}$ of the target cell $Ca_{ij}$ has been determined at S7 or S14, the sequence proceeds to step S8 where i is incremented by 1 (that is, the row is incremented by one row). Then, at step S9, the above-mentioned processes are repeated until i=m has been satisfied. When i=m has been reached and the processes for the first row has been completed, the sequence proceeds to step S10 where j is incremented by 1 (that is, the column is incremented by one column). Then, at step S11, the above-mentioned processes are repeated until j=n has been satisfied, thereby completing the processes.

The above-mentioned description has discussed a method in which the black dot area rate $S_K1$ is calculated on a bit basis, that is, in the case when 0 or 1 is stored as data K with respect to the black dots; however, the same processes can be carried out when the respective heads $11K_1$, $11K_2$, $11K_3$, 11Y, 11M and 11C (see FIG. 3) are variable in the dot size with the input data D for each cell Co being dot-size modulated.

At this time, the black dot area rate $S_K2$ (which will be defined in Embodiment 2), which takes the dot size into consideration by using, for example, a 3×3 filter with respect to the target cell Ca, is calculated, and when this exceeds 50% and the exclusive OR becomes 1, the dots of the respective colors Y, M and C are superposed with the correlation between the dot sizes (ratio with respect to the optimal dot size) as shown in Table 4. The values of the data Y, M, C and K of Table 4 show dot sizes.

TABLE 4

| Data before conversion | Data after conversion | | | |
|---|---|---|---|---|
| K | Y | M | C | K |
| 0 | 0 | 0 | 0 | 0 |
| 25 | 25 | 25 | 25 | 0 |
| 50 | 50 | 50 | 50 | 0 |
| 75 | 75 | 75 | 75 | 0 |
| 100 | 100 | 100 | 100 | 0 |

Moreover, it is also possible to carry out the data conversion while taking into consideration the dot size of the target cell Ca. This will be described, in detail, later in the next Embodiment 2.

As described above, in the ink-jet image-forming apparatus and the image-forming method thereof described in th present embodiment, at areas having a high black-dot density, those dots formed by slow-drying black ink and those dots formed as black dots by mixing quick-drying color inks are alternately placed; therefore, it is possible to solve both of the problems of a reduction in the print speed due to the slow-drying ink and degradation in the image quality due to the quick-drying ink.

Moreover, in the present color ink-jet printer 2, since the ink drying time is short, it is not necessary to provide a drying device 16 (see FIG. 2), or it is possible to reduce the size and output of the device. Therefore, the present color ink-jet printer 2 makes it possible to achieve advantages such as a simplified apparatus, a small-size apparatus, low costs in the apparatus and a reduction in the power consumption.

In the above description, an explanation will be mainly given of cells Co on the memory map. Here, since the cells Co and dots have a one-to-one correspondence, the explanation with respect to the cells Co and the target cell area is also applied to the dots and the target dot area, if necessary.

Moreover, in the present embodiment, the area rate $S_o1$, provided as a value representing the dot density, is defined as described above; however, the present invention is not intended to be strictly limited by the above definition, and other definitions for representing the value of the dot density may be used. In particular, with respect to the definition of the target cell area, besides the above-mentioned definition, for example, a cross-shaped area, which consists of five cells Co including the adjacent cells Co of the target cell Ca in the row and column directions, may be defined.

Moreover, in the present invention, the explanation has been given so as to solve problems with solid black portions; however, the same method can be applied to inks having other colors.

Embodiment 2

Referring to FIGS. 2, 3, 10, 11 and FIGS. 16 through 19, the following description will discuss the second Embodiment of the present invention.

The dot forming method of the ink-jet system of the present embodiment is applied to the color ink-jet printer 2 explained by reference to FIGS. 2, 3, 10 and 11 in Embodiment 1; therefore, those members that have the same functions and that are described in Embodiment 1 are indicated by the same reference numerals and the description thereof is omitted. Moreover, with respect to the terms defined in Embodiment 1, they are also applied to the present embodiment, unless otherwise specified.

Embodiment 1 has exemplified a case in which the respective dots forming a printed image have the same dot size (fixed dot size); in contrast, in the present embodiment, an explanation will be given of a case where the dot size is variable (that is, the dot size is modulated dot).

In the present Embodiment, data D, which is to be stored in each cell Co of the line memory 36 (see FIGS. 10 and 11), is different from that of Embodiment 1. In other words, in Embodiment 1, the data D has either a value 1 or 0 depending on whether or not the data D forms a dot; in contrast, in the present embodiment, the data D is allowed to have a value that indicates a dot size of a dot to be formed.

More specifically, the value possessed by the data D is a ratio to an optimal dot size. Here, supposing that dots corresponding to 100%, 75%, 50% and 25% with respect to the optimal dot size are formed, the corresponding data D are respectively data D=100%, 75%, 50% and 25%.

Here, an explanation will be given of superposition of dots at the time when dots of the respective dot sizes are formed. In the case when dots having the respective dot sizes are formed on a target position and when the dots having the respective sizes are formed at positions adjacent to the target pixel in the horizontal and vertical directions (row and column directions) as well as in the diagonal directions, the presence and absence of superposition between the dot at the target position and the dots at the positions adjacent thereto is represented by Table 5.

TABLE 5

| Dot at Target Position | | Adjacent Dots | | | | | | | |
|---|---|---|---|---|---|---|---|---|---|
| Dot Pitch | Dot | Horizontal and Lateral Directions | | | | Diagonal Directions | | | |
| Ratio | Size | 100% | 75% | 50% | 25% | 100% | 75% | 50% | 25% |
| 1.41 | 100% | x | x | x | o | x | o | o | o |
| 1.06 | 75% | x | x | o | o | o | o | o | o |
| 0.70 | 50% | x | o | o | o | o | o | o | o |
| 0.35 | 25% | o | o | o | o | o | o | o | o |

In Table 5, if there is any superposition between the dot at the target position and any one of the dots adjacent thereto, this case is represented by "x", and if there is not any superposition, this case is represented by "O". Moreover, with respect to the dot pitch ratio, the ratio of the dot size to the dot pitch is given in the table.

As clearly seen by Table 5, in the case when the dot at the target position has a dot size of not more than 50%, the superposition between dots only appears when the dot size of the dot at the target position is 50% and any adjacent dot having a dot size of 100% is located in the horizontal or vertical direction. Here, even in this case, it is found that, when the dot pitch and the respective dot sizes are taken into consideration, the area of the superposed portion is comparatively small.

Therefore, in the present embodiment, the fact that the dot at the target position is a black dot having a dot size exceeding 50%, that is, the fact that the data K stored in the target cell Ca exceeds 50% (data K=75%, 100%), is set as a condition under which the data conversion should be carried out (condition 4).

Next, an explanation will be given of a condition under which the data conversion is carried out depending on the density of the black dot in an area containing the target position. First, in the case when the dot size is modulated, the black dot area rate $S_K2$ (dot area rate) is defined by the following equation 3 as a value indicating the density of black dots at a predetermined area consisting of dot forming positions of m rows×n columns.

$$\text{(Black dot area rate } S_K2) = p2/(m \times n) \qquad \text{Equation 3}$$

Here, p2 represents the total (%) of the dot sizes of the black dots formed within the predetermined area, m represents the number of rows of the dot forming positions within the predetermined area, and n represents the number of columns of the dot forming positions within the predetermined area.

In the same manner as Embodiment 1, the black dot area rate $S_K2$ of a target cell area having 3 rows×3 columns with the target cell Ca located in the center is defined as a black dot area rate $S_K2$ with respect to the target cell Ca. Moreover, in the same manner as Embodiment 1, the fact that the black dot area rate $S_K2$ of the target cell Ca exceeds 50% is set as a condition under which the data conversion should be carried out (condition 5).

The dot at the target position, which is formed in association with the target cell Ca satisfying the condition 4 and the condition 5, is formed as described below. As described earlier, the dot having a dot size of not more than 50% either has no superposed area, or has only a small superposed area. For this reason, even when the dot at the target position satisfies the conditions 4 and 5, the 50% of the dot size is formed by the first black dot. Then, in order to compensate for the insufficient area for the black dot, a dot is formed with the actual dot size of the dot at the target position by using the second black dot. Thus, the black dot area rate $S_K2$, which only takes the first black dot into consideration, can be fixed to not more than 50%.

At this time, with an arrangement in which, after the second black dot has been preliminarily formed, the first black dot is superposed thereon, for example, in the form of a coaxial circle, the second black dot makes it possible to accelerate the absorption of the ink forming the first black dot into recording paper 20 (see FIG. 3), thereby shortening the drying time. Moreover, since the first black dot is formed on the upper side, it is possible to avoid a reduction in the reproducibility of black in a printed image.

More specifically, in the case when the dot sizes of dots at the target position satisfying the conditions 4 and 5 are 75% and 100% respectively, first, the second black dots having dot sizes of 50% and 75% respectively are formed, and on these dots, the first black dots having a dot size of 50% are formed (respectively, also referred to as 75% superposed emissions and 100% superposed emissions) Here, the dot size of the second black dot is determined as described above, by taking the expansion of the dot on the recording paper 20 into consideration.

In contrast, with respect to dots (having dot sizes of 25% and 50%) at the target position, formed by target cells Ca that do not satisfy the condition 4, since the dots are not superposed or the dots have only a small superposed area, with a short ink-drying time, the dots having the corresponding dot sizes are formed by the first black dots. Moreover, since the dot at the target position forming the target cell Ca that does not satisfy the condition 5 has a low density of the black dot at the peripheral portion, also with a short ink-drying time, the dot having the corresponding dot size is formed.

Here, in the same manner as Embodiment 1, even in the case of a dot at the target position formed by a target cell Ca that does not satisfy the condition 5, if it is located at a border to a color area, that is, if there is any color dot positioned within the target dot area (condition 6), and if the condition 4 is also satisfied, the dot is formed in the same manner as the case in which the conditions 4 and 5 are satisfied.

In the case of a color ink-jet printer 2 (FIG. 2) related to the present embodiment, an area rate processing circuit 38 (FIG. 10) has a function as a calculation means for calculating the black dot area rate $S_K2$ and a function as a discrimination means for discriminating whether or not data conversion should be carried out. Then, based upon the presence or absence of this data conversion, ink to be used at the time of forming the dot is determined.

Figure 18:
FIG. 18 is an explanatory drawing that shows data conversion in accordance with another embodiment, within a print data area of the line memory of FIG. 11, with one example of the data after the conversion being shown.
Figure 18:

Referring to FIGS. 16 to 18, an explanation will be given of the data conversion for carrying out the dot formation as described above. FIGS. 16 to 18 are explanatory drawings which indicate the data conversion within the print data area 50 in the line memory 36; and FIG. 16 indicates data D before conversion, FIG. 17 indicates the black dot area rate $S_K2$ of each of the cells Co, and FIG. 18 indicates data D after conversion.

Here, in FIGS. 16 to 18, those cells Co forming black dots are indicated by slanting lines. Moreover, those cells Co forming color dots are indicated simply by "Y", "M" or "C".

First, within the print data area 50 having the data D shown in FIG. 16, with respect to all cells Co having black data, the black dot area rate $S_K2$ of each of the cells Co is successively found. As a result, FIG. 17 shows the dot area rate $S_K2$ of each of the cells Co. Here, the black dot area rate $S_K2$ is not stored in each cell Co; however, for convenience of explanation, in FIG. 17, the black dot area rate $S_K2$ corresponding to each cell Co is displayed.

Based upon the data D before conversion as shown in FIG. 16, discrimination is made as to whether or not the target cell Ca satisfies the condition 4 or the condition 6. Moreover, based upon the black dot area rate $S_K2$ shown in FIG. 17, discrimination is made as to whether or not the target cell Ca satisfies the above-mentioned condition 5. If the conditions 4 and 5 or the conditions 4 and 6 are satisfied, then the data conversion is carried out. Table 6 shows the relationship between data K prior to the conversion of the target cell Ca in this data conversion and data Y, M, C and K after the data conversion. Here, Table 6 is based upon the assumption that the condition 5 or the condition 6 is satisfied.

TABLE 6

| Data before conversion | Data after conversion | | | |
|---|---|---|---|---|
| K | Y | M | C | K |
| 0 | 0 | 0 | 0 | 0 |
| 25 | 0 | 0 | 0 | 25 |
| 50 | 0 | 0 | 0 | 50 |
| 75 | 50 | 50 | 50 | 50 |
| 100 | 75 | 75 | 75 | 50 |

Here, in FIG. 18, the cells Co for forming only the first black dots have displays indicating respective dot sizes, and those cells Co requiring 75% superposed jets and 100% superposed jets have displays indicating "50" together with "ymc" and "YMC" respectively.

Figure 19:
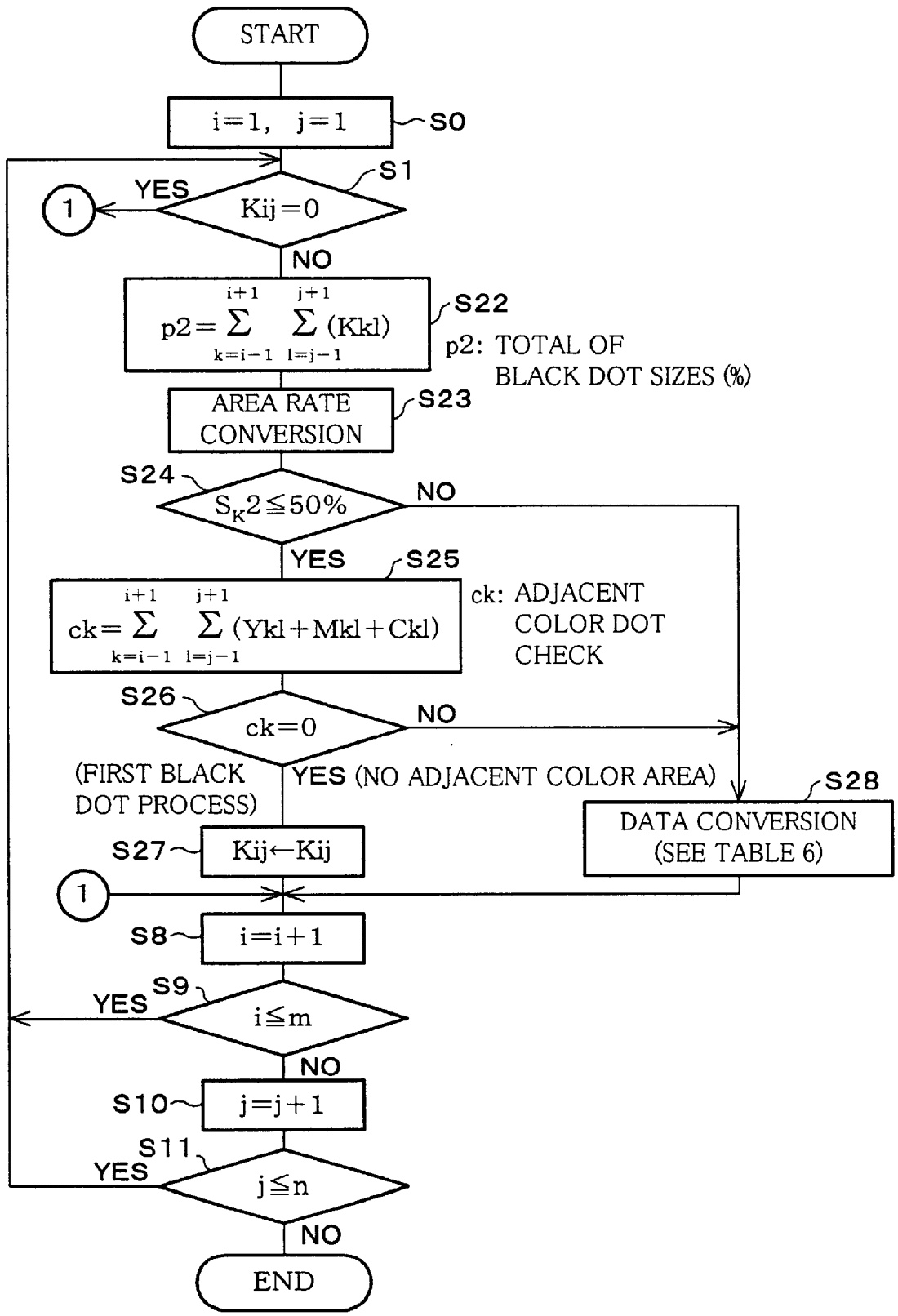
FIG. 19 is a flow chart that shows data processing in accordance with another embodiment of the present invention.

Referring to a flow chart of FIG. 19, an explanation will be given of the above-mentioned processes. FIG. 19 is a flow chart that shows the data process in accordance with the present embodiment. In the flow chart shown in FIG. 19, with respect to the steps that carry out the same processes as the flow chart of FIG. 1 in Embodiment 1, the same step numbers are used and the description thereof will be partially omitted.

After having carried out the same processes as steps S0 and S1 of Embodiment 1, the process of step S22 is carried out. In step S22, the addition of data K of those cells having the black data (data K>0), that is, the addition of the dot sizes of the black dots within the target cell area, is found by carrying out a process using the filter of 3 rows×3 columns, thereby defining the resulting value as the total p2 of the dot sizes of the black dots.

Here, the target cell area is fixed to 3 rows×3 columns in the same manner as Embodiment 1; therefore, in the case when the black dot area rate $S_K2$ is actually found from the total p2 of the dot sizes of the black dots, the area rate conversion table (not shown), which is a table representing the relationship between the total p2 of the dot sizes of the black dots and the black dot area rate $S_K2$, can be used to find the black dot area rate $S_K2$ without carrying out a dividing process, thereby making it possible to greatly shorten the time required for the operation process for finding the black dot area rate $S_K2$. This conversion is carried out at step S23. Here, the total p2 of the dot sizes of the black dots may be directly used for discrimination at step S24.

Then, at step S24, a judgment is made with respect to the black dot area rate $S_K2$ of the target cell $Ca_{ij}$. At step S24, if the black dot area rate $S_K2$ is not more than 50%, then the sequence proceeds to step S5, and at succeeding step S26, a judgment is made with respect to the adjacent dot check ck found in step S5. Here, in the case when no data D for forming color dots is present within the target cell area, that is, in the case of ck=0, the original black data (data $K_{ij}$) is applied to the target cell $Ca_{ij}$ at step S27 (no data conversion is made)

Here, in the case when the black dot area rate $S_K2$ exceeds 50% at step S24, or in the case when data D forming color dots is present at step S26, data conversion is appropriately made at step S28 based upon Table 6.

When the data D of the target cell $Ca_{ij}$ has been determined at S27 or S28, the same processes as those of Embodiment 1 are carried out.

As described above, in the ink-jet image-forming method of the present embodiment, even in the case of the variable dot size, it is possible to simultaneously solve a problem of a reduction in the print speed due to slow-drying ink and a problem of degradation in the image quality due to quick-drying ink, in the same manner as Embodiment 1.

Embodiment 3

As described above, in the ink-jet image-forming methods and the image-forming apparatuses in accordance with Embodiments 1 and 2, depending on the density of dots, only slow-drying ink is used, or black dots formed by quick-drying ink are used in a combined manner; thus, it becomes possible to shorten the drying time without causing degradation in the image quality.

In other words, in accordance with the ink-jet image-forming methods and the image-forming apparatuses of Embodiments 1 and 2, a drying means, which has a great power consumption and causes high costs of the apparatus, can be omitted or can be reduced in its scale, and it is possible to dry an area having a high dot density efficiently while avoiding degradation in the image quality.

Moreover, even in the outline portion, the black dots are allowed to exist without being thinned; thus, it is possible to avoid degradation in the outline portion due to shaggy printing.

However, in the above-mentioned ink-jet image-forming methods and image-forming apparatuses, depending on printing conditions, shaggy printing tends to occur at the outline portion of a black area due to irregularities in the dot diameter or the dot position between the black dot derived from slow-drying ink and the black dot derived from quick-drying ink. Moreover, upon superposing Y, M and C of quick-drying ink to form the second black dot, deviation in the dot position tends to occur in the direction toward the blank portion, resulting in irregularities in colors at the border portion. These problems become more conspicuous in a system where a black ink head and color ink head can be individually exchanged.

Therefore, Embodiments 3 and 4 will discuss an ink-jet image forming method and an image-forming apparatus which can prevent the above-mentioned irregularities occurring in the outline portion, shorten the drying time and reduce degradation in the image quality.

Referring to FIGS. 2, 3, 10, 11 and FIGS. 20 through 24, the following description will discuss the third Embodiment of the present invention.

Here, the dot forming method of the ink-jet system of the present embodiment is applied to the color ink-jet printer 2 explained by reference to FIGS. 2, 3, 10 and 11 in Embodiment 1; therefore, those members that have the same functions and that are described in Embodiment 1 are indicated by the same reference numerals and the description thereof is omitted. Moreover, with respect to the terms defined in Embodiment 1, they are also applied to the present embodiment, unless otherwise specified.

Embodiment 1 has exemplified a case in which those cells having black data in the border portion to a color area are taken as a target for data conversion, and quick-drying ink is applied thereto; in contrast, in the present embodiment, an explanation will be given of a case in which the use of quick-drying ink is inhibited at the outline portion of a black area, that is, at the border portion between a color area and a blank area.

Figure 24:
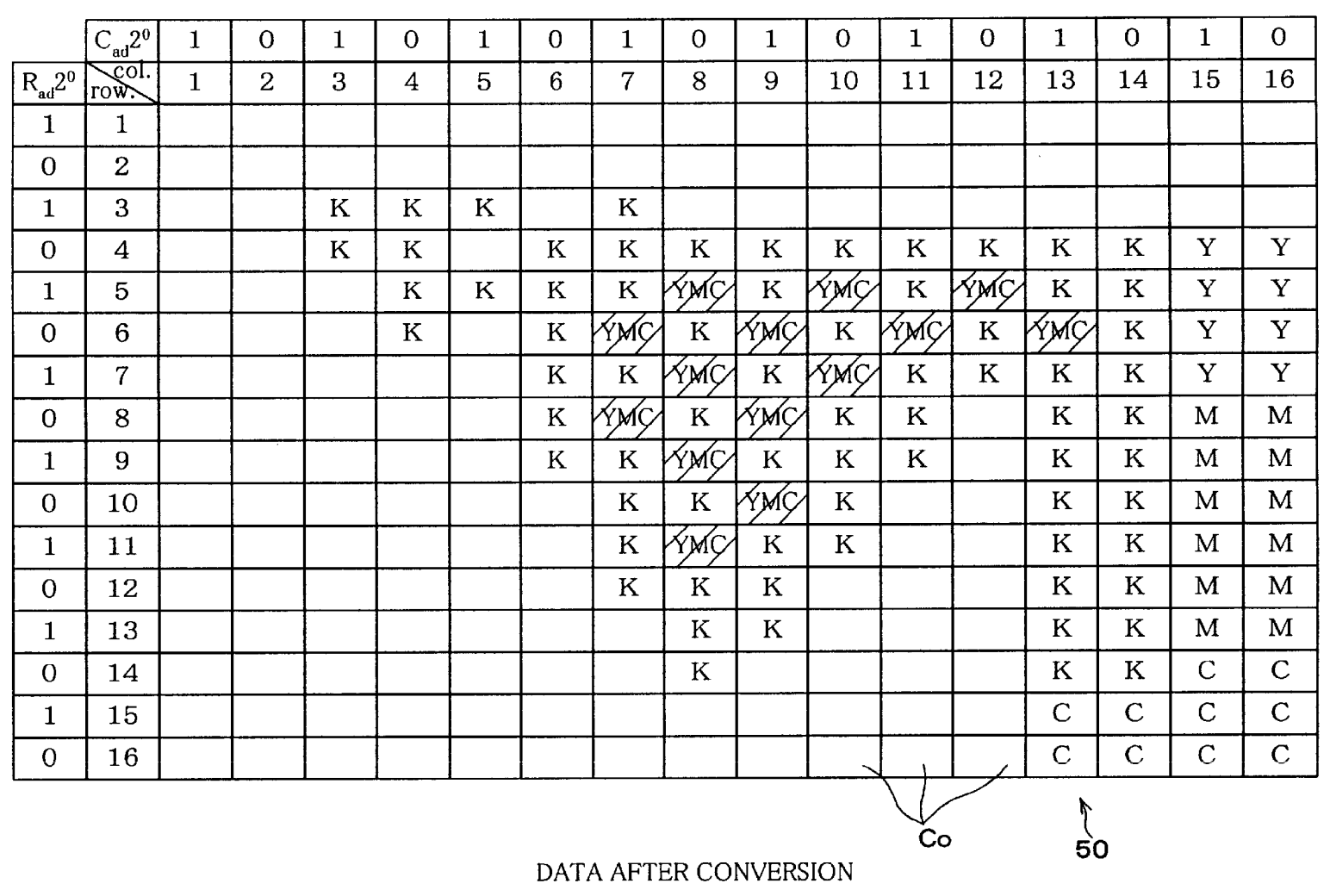

Referring to FIGS. 21 to 24, an explanation will be given of a method in which a black dot to be formed is determined based upon the black dot area rate $S_K1$. FIGS. 21 to 24 are explanatory drawings that show data conversion within the print data area 50 of the line memory 36; and FIG. 21 shows data D before the conversion, FIG. 22 shows the black dot area rate $S_K1$ of each cell Co, FIG. 23 shows an outline bit map of data D, and FIG. 24 shows data D after the conversion.

Here, in FIGS. 21 and 24, when data Y, M, C and K are 1, they are respectively displayed as "Y", "M", "C" and "K", and when data Y, M, C and K are zero, no displays are given thereto. Moreover, it is assumed that data D of cells Co adjacent to the area shown in the Figure are all zero. In FIG. 23, those cells forming the outline portion of a black area, that is, those cells having black data (K≠0), which are in contact with a color area or a blank area (K=0), are taken as outline dots which are displayed as outline dot check "1".

First, within the print data area 50 having the data D shown in FIG. 21, with respect to all cells Co having black data, the black dot area rate $S_K1$ of each of the cells is successively found. As a result, FIG. 22 shows the dot area rate $S_K1$ of each of the cells Co. Here, the black dot area rate $S_K1$ is not stored in each cell Co; however, for convenience of explanation, in FIG. 22, the black dot area rate $S_K1$ corresponding to each cell Co is displayed.

As described above, when the black dot area rate $S_K1$ exceeds 50% (that is, not less than 5/9), there is an extreme drop in the print speed; therefore, the fact that the black dot area rate $S_K1$ exceeds 50% is used as a condition under which conversion is made (data conversion) so as to use the second black dot in place of the first black dot with respect to the data D of the cells Co (condition 1).

Here, suppose that among cells Co (group of high density dots) having the black dot area rate $S_K1$ exceeding 50%, those cells Co that are actually to be data-converted so as to use the second black dot are alternately placed in the row direction and the column direction. In this case, for example, those cells, which provide 1 as the exclusive OR of the address $R_{ad}2^0$ that is the lowest row address bit of the cells Co and the address $C_{ad}2^0$ that is the lowest column address bit thereof, are set to be target cells for the data conversion (condition 2). In FIGS. 21 to 22, those cells Co that have black dot data K before conversion and that also provide 1 as the exclusive OR are indicated by slanting lines.

With this arrangement, in the case when cells Co whose black dot area rate $S_K1$ exceeds 50% are located adjacent with each other in the row direction and the column direction, those cells Co having data K for forming the first dot (hereinafter, referred to as the first black data) and those cells Co having data K for forming the second dot (hereinafter, referred to as the second black data) are alternately arranged.

Moreover, with respect to an outline portion (FIG. 23) of a black image, that is, with respect to the cells Co having the black data at a border (border portion) to a color area (where any of data Y, M and C is not "zero"), no conversion is made with the condition 1 and the condition 2 being neglected (condition 7). In other words, in order to prevent degradation in the image quality due to an increase in shaggy printing caused by irregularities in the dot diameter or the dot position between the first dot and the second dot and due to deviation in the dot position occurring in the direction toward the blank portion when Y, N and C dots are superposed so as to form the second dot by mixing colors, the top priority is given to the inhibition of data conversion even when the black dot area rate $S_K1$ is not less than 50%. For this reason, the outline black data (cells Co at the outline portion of a black image) is omitted from the target for data conversion. Thus, in the case when the corresponding dot at a target position is an outline dot (condition 7), the conversion is inhibited regardless of the condition 1 and the condition 2, with the result that the outline dot is formed by the first black dot.

In contrast, the second black dot is formed by overlapping inks of respective colors (color ink). Therefore, the values stored in the cells Co that have been subjected to the data conversion to the second black data are all "1" with respect to data Y, M and C, and "0" with respect to data K. Table 3 shows the relationship between data D prior to the conversion and data D after the conversion in the data conversion.

FIG. 24 shows the results of the above-mentioned data conversion. In FIG. 24, cells Co that are left by excluding the outline dots of the black area (see FIG. 23) from those cells Co having the black dot data K before the conversion and also having an exclusive OR of 1 are indicated by slanting lines.

As clearly seen from FIG. 24, as a result of the alternate arrangement, in an area having continuous high black dot area rates, only five of the first black dots are formed within the 3×3 dots at most; thus, the black dot area rate is restricted to not more than 5/9 and the second black dots account for the rest of the black dot area rate. Although 5/9 is greater than 50%, it is close to 50%, and it is possible to realize a virtually optimal ink distribution by using a simple dot arrangement. In addition, at the outline portion of the black area, it is possible to prevent degradation in the image quality by inhibiting the data conversion even in the case of not less than 50% of the black dot area rate $S_K1$ of the cell Co.

In the case of a color ink-jet printer 2 (FIG. 2) related to the present embodiment, an area rate processing circuit 38 (FIG. 10) has a function as a calculation means for calculating the black dot area rate $S_K1$ and a function as a discrimination means for discriminating whether or not data conversion should be carried out. Then, based upon the presence or absence of this data conversion, ink to be used at the time of forming the dot is determined.

Figure 20:
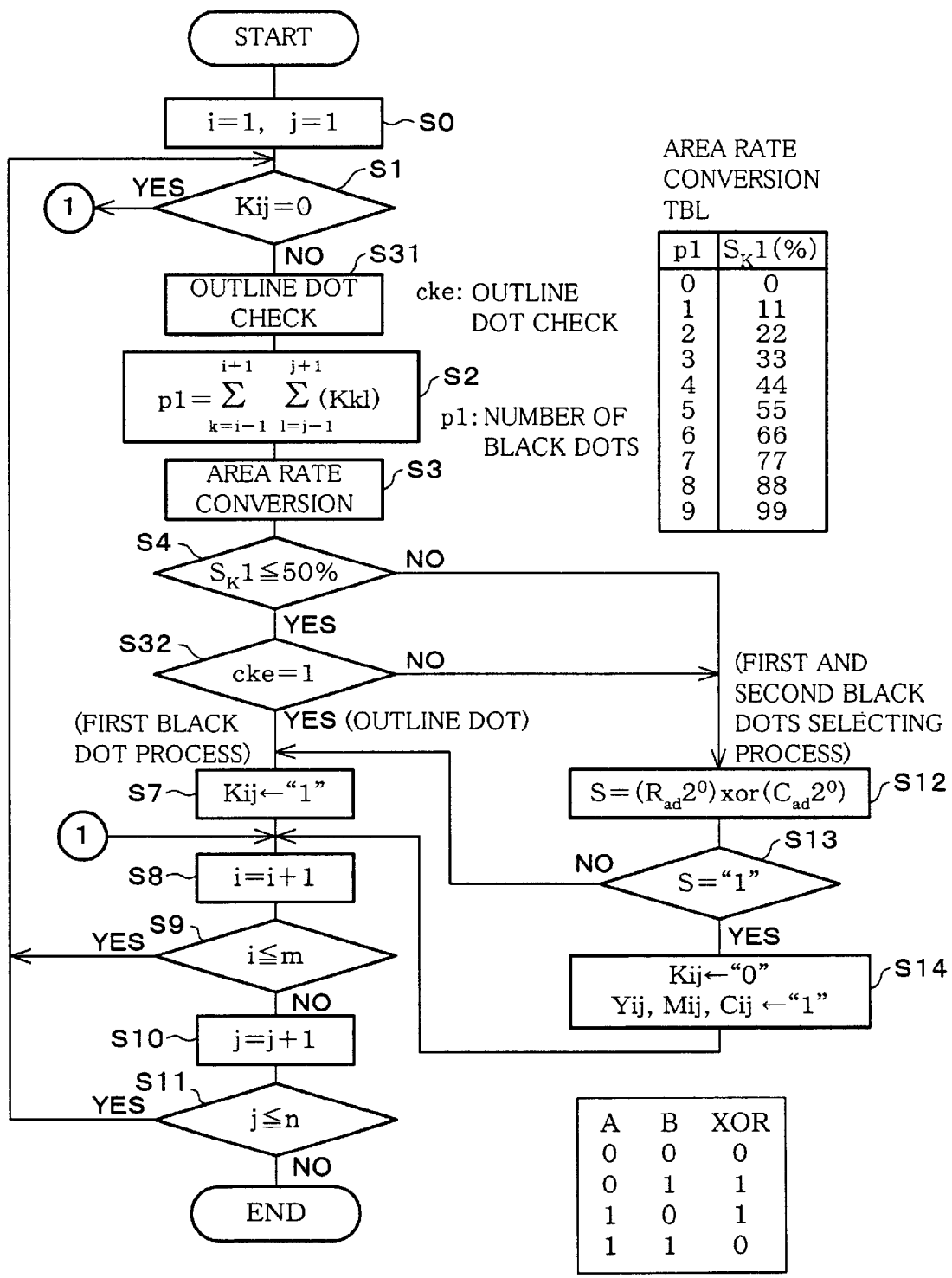
FIG. 20 is a flow chart that shows data processing in accordance with still another embodiment of the present invention.

Referring to a flow chart of FIG. 20, an explanation will be given of the above-mentioned processes. FIG. 20 is a flow chart that shows the data process in accordance with the present embodiment. In the process shown in FIG. 20, the respective cells Co in the first row are successively taken as the target cell Ca, and the dot state of the target cell Ca (the black dot area rate $S_K1$ and outline dot check cke) are found, and these processes are repeated up to the n-th row.

Here, for convenience of explanation, the data D after conversion is stored in a separate manner from the data D prior to the conversion, and it is supposed that the data D prior to the conversion used in the following respective steps is not changed.

First, in step S0, the target cell $Ca_{ij}$ is set at (i, j)=(1, 1) as an initial value. Then, at step S1, a judgment is made as to whether or not the target cell $Ca_{ij}$ has the black data. Here, in the case when the target cell $Ca_{ij}$ has the black data (data $K_{ij}=1$), the sequence proceeds to step S31, and in the case when it has no black data ($K_{ij}=0$), the sequence proceeds to step S8.

At step S31, a check is made to see whether or not the target cell $Ca_{ij}$ is an outline dot. More specifically, the results of the operations of data K within the target cell area are substituted in the outline dot check cke defined by equation 4. Therefore, when the target cell $Ca_{ij}$ is an outline dot, the outline dot check becomes cke=1, and when the target cell $Ca_{ij}$ is not an outline dot, the outline dot check becomes cke=0.

$$cke = \left\{ \sum_{k=i-1}^{i+1} \text{NOT}(\text{SIGN}(K_{k,j-1})) + \text{NOT}(\text{SIGN}(K_{k+1,j})) + \text{NOT}(\text{SIGN}(K_{k-1,j})) \sum_{k=i-1}^{i+1} \text{NOT}(\text{SIGN}(K_{k,j+1})) \right\} \cdot \text{SIGN}(K_{k,j})$$

$$= \left\{ \sum_{k=i-1}^{i+1} \sum_{l=j-1}^{j+1} (\text{NOT}(\text{SIGN}(K_{k,l}))) \right\} \cdot \text{SIGN}(K_{i,j})$$

Equation 4

Here, SIGN (numerical value) of equation 4 is an operation expression for checking to see whether a numerical value that is an argument is negative or positive, and when the numerical value is a positive number, the return value is given as 1, when it is 0, the return value is given as 0, and when it is a negative number, the return value is given as −1. Here, since $K_{ij}$ is dot data and given as 0 or a positive value, SIGN ($K_{ij}$) never forms a negative number. Moreover, NOT (logical expression) is an operation expression for finding NOT of a logical expression that is an argument. Therefore, NOT (SIGN($K_{ij}$)) gives 1 only when $K_{ij}$ is 0, and gives 0 in the other cases.

Next, at step S2, those cells having the black data (data K=1) within the target cell area are counted by carrying out a process using the filter of 3 rows×3 columns, thereby defining the resulting value as black dot number p1.

Successively, at step S4, a judgment is made with respect to the black dot area rate $S_K1$ of the target cell $Ca_{ij}$. At step S4, if the black dot area rate $S_K1$ is not more than 50%, then the sequence proceeds to step S32.

At step S32, a judgment is made as to the outline dot check cke found at step S31. Here, if the target cell is an outline dot, that is, if cke=1 holds, then the sequence proceeds to step S7 where the first black data (data $K_{ij}=1$) is applied to the data $D_{ij}$ of the target cell $Ca_{ij}$ (no data conversion is made).

In contrast, in the case when the black dot area rate $S_K1$ exceeds 50% at step S4, or in the case when the target cell is not an outline dot at step S32, that is, cke=0 holds, the sequence proceeds to step S12 where an exclusive OR is found between the address $R_{ad}2^0$ and the address $C_{ad}2^0$, and the value is set as the exclusive OR S. Then, at step S13, a judgment is made with respect to the exclusive OR S, and in the case when the exclusive OR S is zero, the sequence proceeds to S7 where, as described above, the first black data (data $K_{ij}=1$) is applied to the data $D_{ij}$ of the target cell $Ca_{ij}$ (no data conversion is made).

In the case when the exclusive OR S is 1 in step 13, the second black data (data $Y_{ij} \cdot M_{ij} \cdot C_{ij}=1$, data $K_{ij}=0$) is applied to the target cell $Ca_{ij}$ at step S14 (that is, data conversion is made).

When the data $D_{ij}$ of the target cell $Ca_{ij}$ has been determined at S7 or S14, the sequence proceeds to step S8 where i is incremented by 1 (that is, the row is incremented by one row). Then, at step S9, the above-mentioned processes are repeated until i=m has been satisfied. When i=m has been reached and the processes for the first row has been completed, the sequence proceeds to step S10 where j is incremented by 1 (that is, the column is incremented by one column). Then, at step S11, the above-mentioned processes are repeated until j=n has been satisfied, thereby completing the processes.

The above-mentioned description has discussed a case in which 0 or 1 is stored in the respective cells Co as data K with respect to the black dots, that is, a method in which the black dot area rate $S_K 1$ is calculated on a bit basis. However, the same processes can be carried out when the respective heads $11K_1$, $11K_2$, $11K_3$, $11Y$, $11M$ and $11C$ (see FIG. 3) are variable in the dot size with the input data D for each cell Co being dot-size modulated. Moreover, the data conversion may be carried out by taking the dot size of the target cell Ca into consideration. This will be discussed in detail in the following Embodiment 4.

As described above, in the ink-jet image-forming apparatus and the image-forming method thereof described in the present embodiment, at areas having a high black-dot density, those dots formed by slow-drying black ink and those dots formed as black dots by mixing quick-drying color inks are alternately placed; therefore, it is possible to solve both of the problems of a reduction in the print speed due to the slow-drying ink and degradation in the image quality due to the quick-drying ink.

Moreover, in the present color ink-jet printer 2, since the ink drying time is short, it is not necessary to provide a drying device 16 (see FIG. 2), or it is possible to reduce the size and output of the device. Therefore, the present color ink-jet printer 2 makes it possible to achieve advantages such as a simplified apparatus, a small-size apparatus, low costs in the apparatus and a reduction in the power consumption.

Furthermore, in the outline portion of a black image, only the first black dots are formed. Therefore, it is possible to prevent an increase in shaggy printing caused by irregularities in the dot diameter or the dot position between the first black dots and the second black dots, and also to prevent deviation in the dot position occurring in the direction toward the blank portion when Y, M and C dots are superposed so as to form the second black dot by mixing colors and the subsequent color irregularities occurring on the blank portion side of the outline portion; thus, it becomes possible to prevent the above-mentioned disadvantages from causing degradation in the image quality.

Embodiment 4

Referring to FIGS. 2, 3, FIGS. 10, 11 and FIGS. 25 through 28, as well as FIG. 23, the following description will discuss the fourth Embodiment of the present invention.

The dot forming method of the ink-jet system of the present embodiment is applied to the color ink-jet printer 2 explained by reference to FIGS. 2, 3, 10 and 11 in Embodiment 1; therefore, those members that have the same functions and that are described in Embodiment 1 are indicated by the same reference numerals and the description thereof is omitted. Moreover, with respect to the terms defined in Embodiment 1, they are also applied to the present embodiment, unless otherwise specified.

Embodiment 3 has exemplified a case in which the respective dots forming a printed image have the same dot size (fixed dot size); in contrast, in the present embodiment, an explanation will be given of a case where the dot size is variable (that is, the dot size is modulated). In other words, Embodiment 2 has exemplified a case in which those cells having black data in the border portion to a color area are taken as a target for data conversion, and quick-drying ink is applied thereto; in contrast, in the present embodiment, an explanation will be given of a case in which the use of quick-drying ink is inhibited at the outline portion of a black area, that is, at the border portion between a color area and a blank area.

Figure 27:
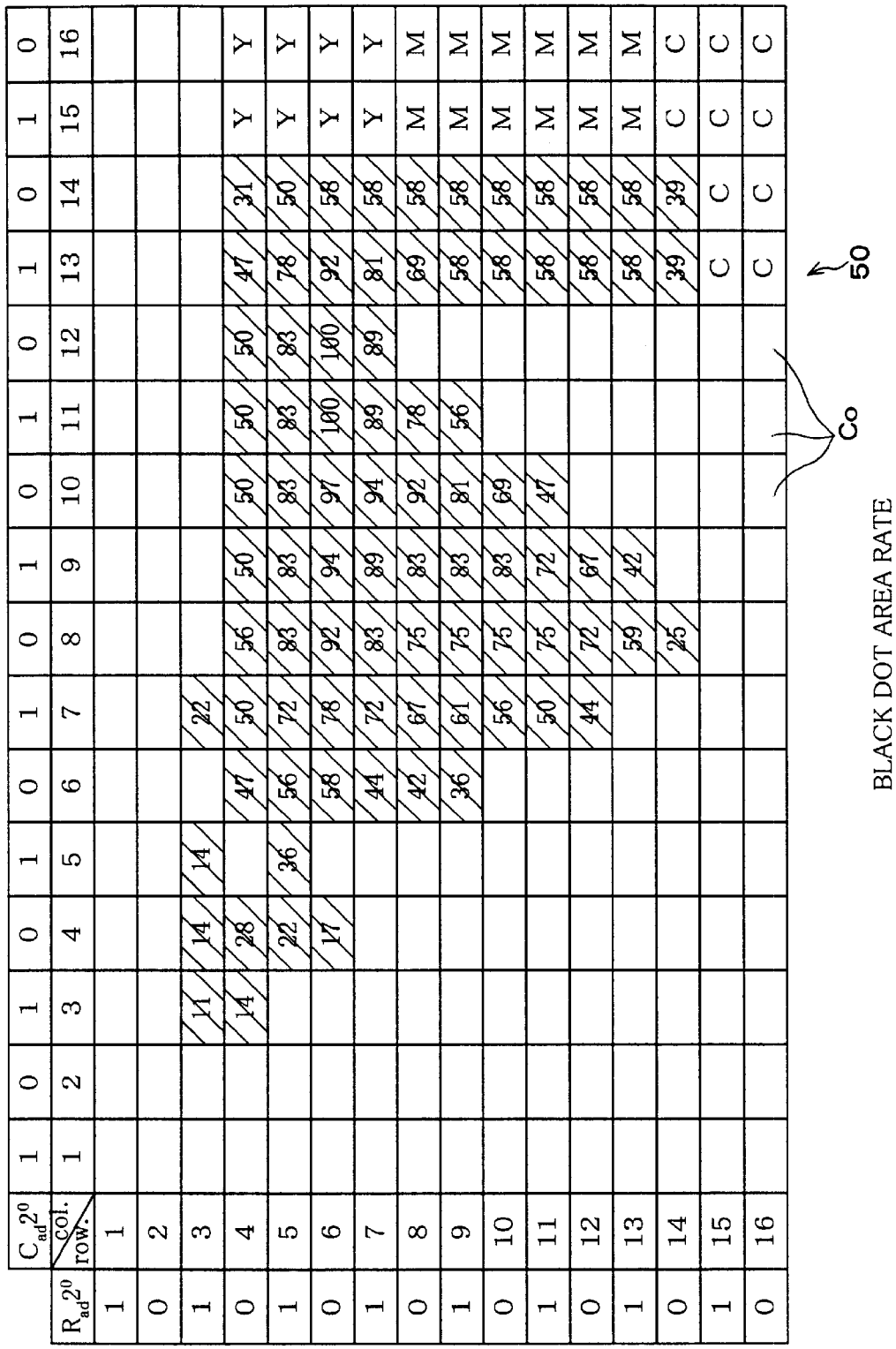
FIG. 27 is an explanatory drawing that shows data conversion in accordance with still another embodiment, within a print data area of the line memory of FIG. 11, with one example of a black dot area rate of each cell being indicated.
Figure 28:
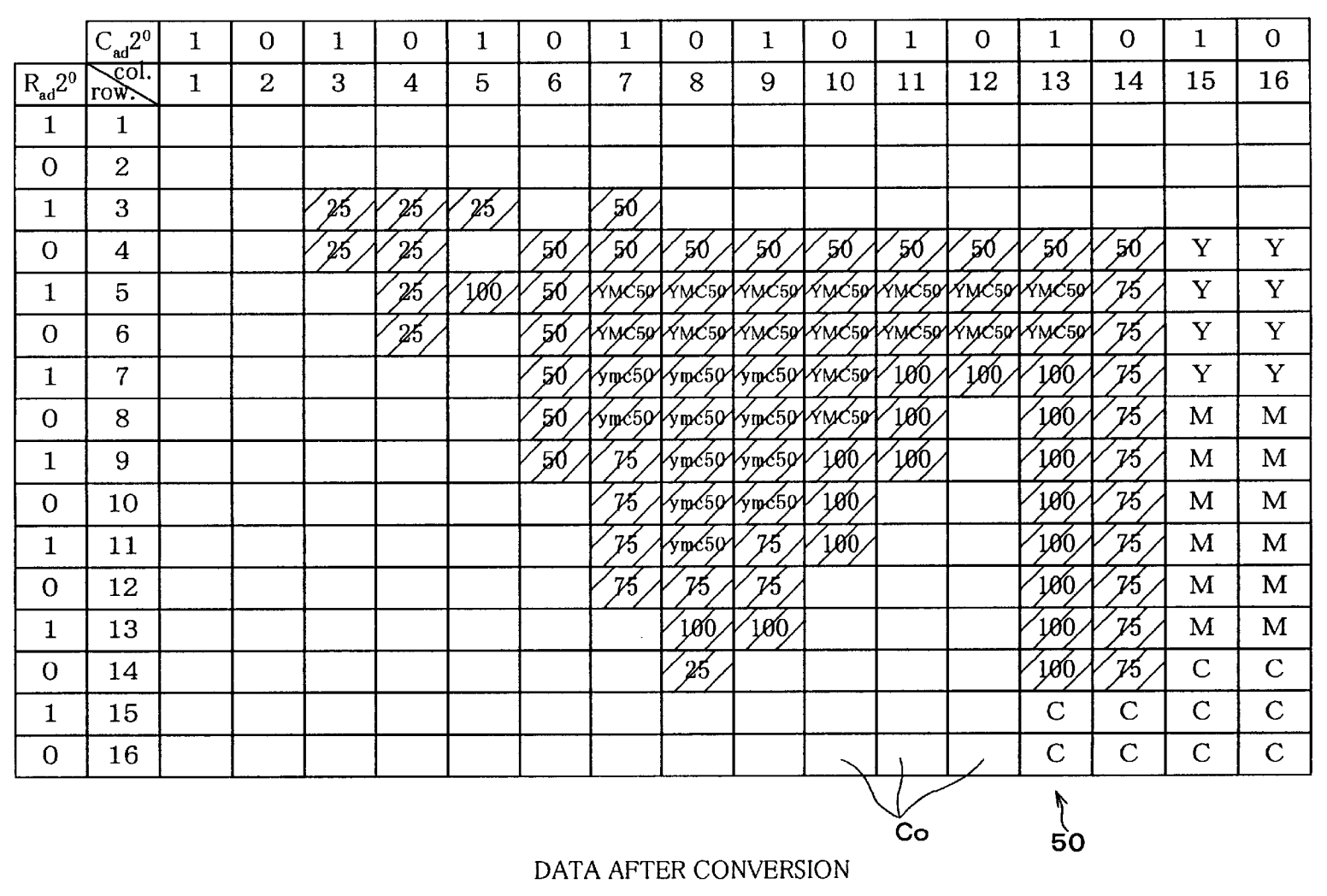
Figure 29:
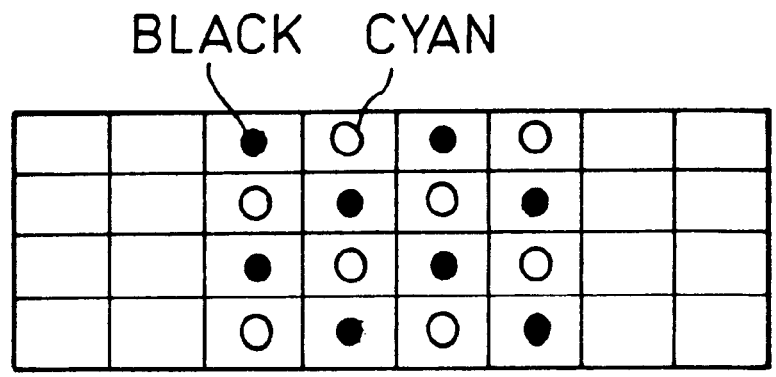
FIG. 29 is a plan view that shows an example of a dot formation in a conventional technique.
Figure 30:
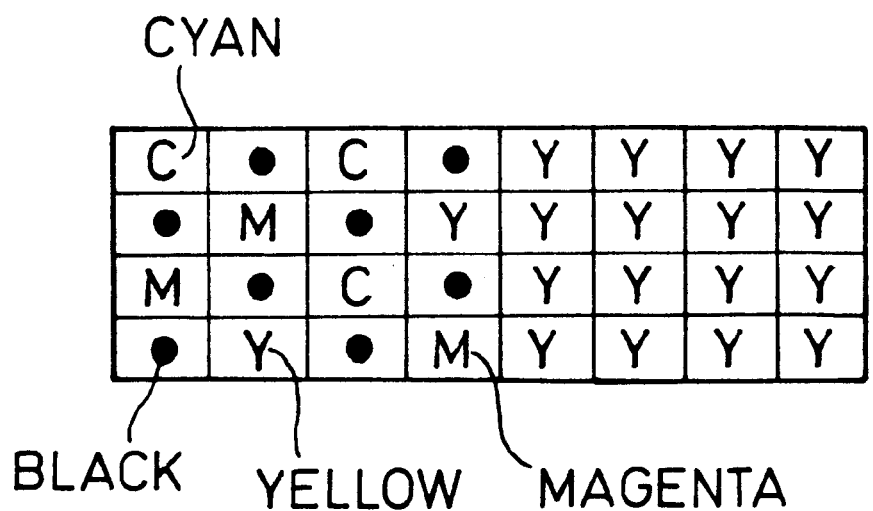
FIG. 30 is a plan view that shows another example of a dot formation in a conventional technique.

Referring to FIGS. 26, 27, 23 and 28, an explanation will be given of a method in which a black dot to be formed is determined based upon the black dot area rate $S_K 2$. FIGS. 26, 27, 23 and 28 are explanatory drawings that show data conversion within the print data area 50 of the line memory 36; and FIG. 26 shows data D prior to the conversion, FIG. 27 shows the black dot area rate $S_K 2$ of each cell Co, FIG. 23 shows an outline bit map of data D, and FIG. 28 shows data D after the conversion.

Here, in FIGS. 26, 27, 23 and 28, those cells Co that are to form black dots are indicated by slanting lines. Moreover, with respect to cells Co that are to form color dots, they are simply displayed as "Y", "M" and "C" respectively. Moreover, in FIG. 23, those cells forming the outline portion of a black area, that is, those cells having black data (K≠0), which are in contact with a color area or a blank area (K=0), are taken as outline dots which are displayed as outline dot check "1".

First, in the present embodiment, the fact that the dot at the target position is a black dot having a dot size exceeding 50%, that is, the fact that the data K stored in the target cell Ca exceeds 50% (data K=75%, 100%), is set as a condition under which the data conversion should be carried out (condition 4).

Next, within the print data area 50 having the data D shown in FIG. 26, with respect to all cells Co having black data, the black dot area rate $S_K 2$ of each of the cells is successively found. As a result, FIG. 27 shows the dot area rate $S_K 2$ of each of the cells Co. Here, the black dot area rate $S_K 2$ is not stored in each cell Co; however, for convenience of explanation, in FIG. 27, the black dot area rate $S_K 2$ corresponding to each cell Co is displayed.

Moreover, in the same manner as Embodiment 2, the fact that the black dot area rate $S_K 2$ of the target cell Ca exceeds 50% is set as a condition under which the data conversion should be carried out (condition 5).

Furthermore, in the same manner as Embodiment 3, with respect to an outline portion (FIG. 23) of a black image, that is, with respect to the cells Co having the black data at a border (border portion) to a color area (where any of data Y, M and C is not "zero") no conversion is made with the condition 4 and the condition 5 being neglected (condition 8). In other words, in order to prevent degradation in the image quality due to an increase in shaggy printing caused by irregularities in the dot diameter or the dot position between the first dot and the second dot and due to color irregularities occurring on the blank portion side of the outline portion caused by deviation in the dot position occurring in the direction toward the blank portion when Y, M and C dots are superposed so as to form the second dot by mixing colors, the top priority is given to the inhibition of data conversion even when the black dot area rate $S_K 2$ is not less than 50%. For this reason, the outline black data (cells Co at the outline portion of a black image) is omitted from the target for data conversion. Thus, in the same manner as Embodiment 3, in the case when the corresponding dot at a target position is an outline dot (condition 8), the conversion is inhibited regardless of the condition 4 and the condition 5, with the result that the first black dot is formed by the outline dot.

FIG. 28 shows the results of the above-mentioned data conversion. Here, in the data conversion, the relationship between the data K of the target cell Ca before conversion and the data Y, M, C and K after the conversion is shown in Table 6. Here, in FIG. 28, the cells Co for forming only the first black dots have displays indicating respective dot sizes, and those cells Co requiring 75% superposed jets and 100% superposed jets have displays indicating "50" together with "ymc" and "YMC" respectively.

As clearly seen by FIG. 28, at the outline portion of the black area, it is possible to prevent degradation in the image quality by inhibiting the data conversion even in the case of not less than 50% of the black dot area rate $S_K2$ of the cells Co.

In the case of a color ink-jet printer 2 (FIG. 2) related to the present embodiment, an area rate processing circuit 38 (FIG. 10) has a function as a calculation means for calculating the black dot area rate $S_K2$ and a function as a discrimination means for discriminating whether or not data conversion should be carried out. Then, based upon the presence or absence of this data conversion, ink to be used at the time of forming the dot is determined.

Figure 25:
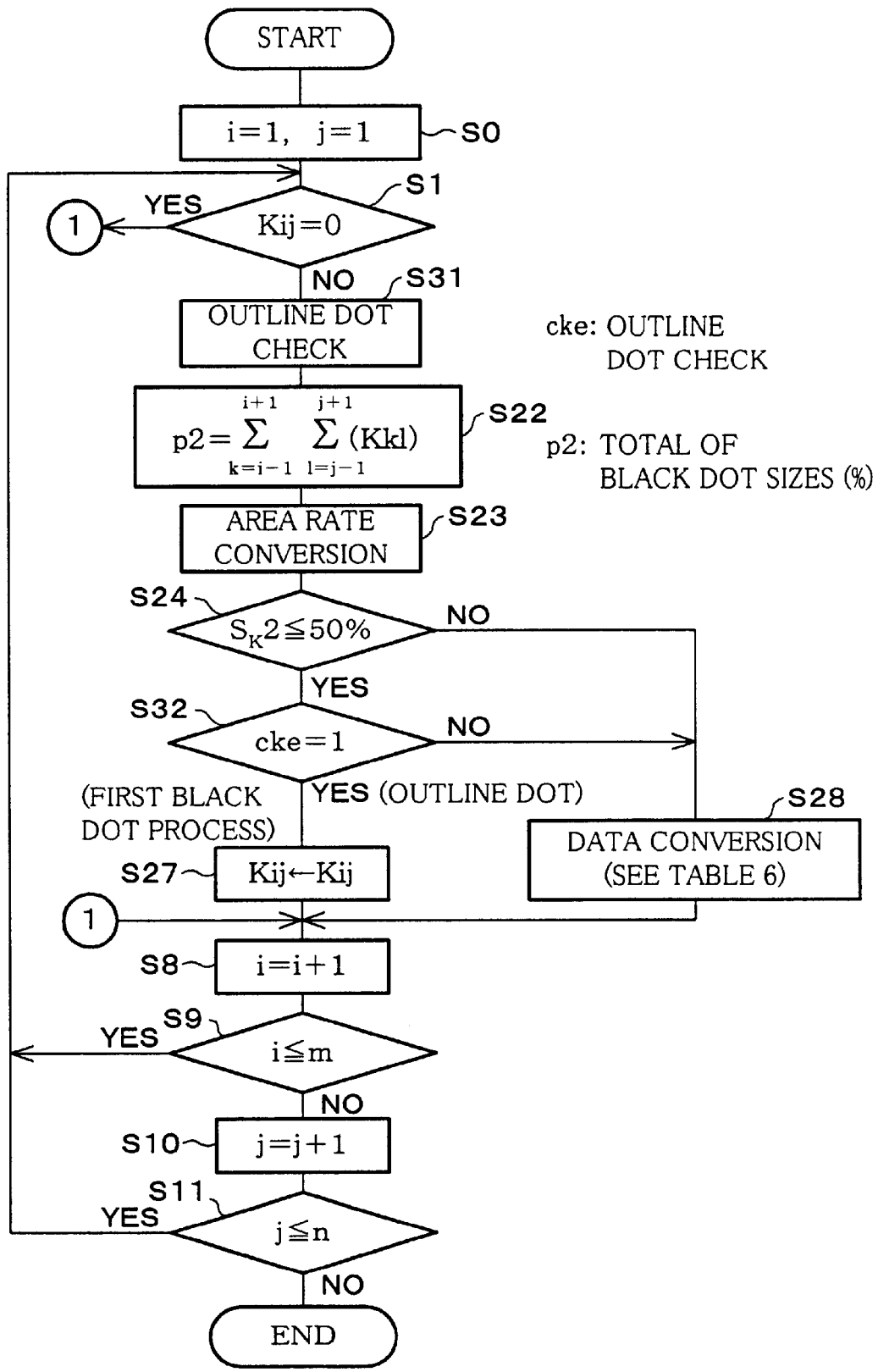
FIG. 25 is a flow chart that shows data processing in accordance with still another embodiment of the present invention.

Referring to a flow chart of FIG. 25, an explanation will be given of the above-mentioned processes. FIG. 25 is a flow chart that shows the data process in accordance with the present embodiment. In the flow chart shown in FIG. 25, with respect to the steps that carry out the same processes as the flow charts of FIGS. 1, 19 and 20 in Embodiments 1 to 3, the same step numbers are used and the description thereof will be partially omitted.

After the processes of step S0 and step S1 have been carried out in the same manner as Embodiment 1, the process of step S31 is carried out.

At step S31, a check is made to see whether or not the target cell $Ca_{ij}$ is an outline dot. More specifically, the results of the operations of data K within the target cell area are substituted in the outline dot check cke defined by equation 4 shown in Embodiment 3. Therefore, when the target cell $Ca_{ij}$ is an outline dot, the outline dot check becomes cke=1, and when the target cell $Ca_{ij}$ is not an outline dot, the outline dot check becomes cke=0.

Next, in step S22, the addition of data K of those cells having the black data (data K>0), that is, the addition of the dot sizes of the black dots within the target cell area, is found by carrying out a process using the filter of 3 rows×3 columns, thereby defining the resulting value as the total p2 of the dot sizes of the black dots. Successively, at step S23, based upon an area-rate conversion table (not shown), the black dot area rate $S_K2$ is found from the total p2 of the dot sizes of the black dots.

Then, at step S24, a judgment is made with respect to the black dot area rate $S_K2$ of the target cell $Ca_{ij}$. At step S24, if the black dot area rate $S_K2$ is not more than 50%, then the sequence proceeds to step S32, and at step S32, a judgment is further made with respect to the outline dot check cke found in step S31. Here, if the target cell $Ca_{ij}$ is an outline dot, that is, cke=1 holds, then the original black data (data $K_{ij}$) is applied to the target cell $Ca_{ij}$ at step S27 (no data conversion is made).

In contrast, if the black dot area rate $S_K2$ exceeds 50% at step S24, or if the target cell $Ca_{ij}$ is not an outline dot at step S32, data conversion is carried out appropriately based upon Table 6 at step S28.

After data D of the target cell $Ca_{ij}$ has been determined at step S27 or step S28, the same processes as Embodiment 1 are carried out.

As described above, in the ink-jet image-forming method of the present embodiment, even in the case of the variable dot size, it is possible to simultaneously solve a problem of a reduction in the print speed due to slow-drying ink and a problem of degradation in the image quality due to quick-drying ink, in the same manner as Embodiment 2.

Moreover, in the outline portion of a black image, only the first black dot is formed. Therefore, it is possible to prevent an increase in shaggy printing caused by irregularities in the dot diameter or the dot position between the first black dot and the second black dot, and also to prevent deviation in the dot position occurring in the direction toward the blank portion when Y, M and C dots are superposed so as to form the second black dot by mixing colors and the subsequent color irregularities occurring on the blank portion side of the outline portion; thus, it becomes possible to prevent the above-mentioned disadvantages from causing degradation in the image quality.

The ink-jet image-forming method in accordance with Embodiments 3 and 4 in which dots are formed by using a slow-drying ink having a comparatively long drying time and a quick-drying ink having a comparatively short drying time so that the dots form an image may have an arrangement in which: the density of the dots in an image area within a predetermined range is discriminated based upon image data, and based upon the results of the discrimination, ink is selected from the slow-drying ink and the quick-drying ink so as to form the dots, and an outline portion of an image to be recorded is detected, and in the outline portion thus detected, the ink selection based upon the results of the discrimination is inhibited within the outline portion.

Moreover, the ink-jet image-forming method in accordance with Embodiments 3 and 4 may be arranged so that in the outline portion of the recording image in which the selection of the ink is inhibited, the slow-drying ink (black) is used.

Furthermore, the ink-jet image-forming apparatus in accordance with Embodiments 3 and 4 in which dots are formed by using a slow-drying ink having a comparatively long drying time and a quick-drying ink having a comparatively short drying time so that the dots form an image may be provided with a calculation means which, upon forming the dots, calculates a dot area rate that represents the density of the dots formed within a predetermined area for the dots, a discrimination means which, based upon the dot area rate, selects ink to be used from the slow-drying ink and the quick-drying ink, a means which discriminates an outline portion of a recording image, and a means which inhibits the selection of the ink based upon the dot area rate in the outline portion detected.

The ink-jet image-forming apparatus in accordance with Embodiments 3 and 4 may be arranged so that a slow-drying ink (black) is used in the outline portion of a recording image in which selection of ink has been inhibited.

As described above, in the ink-jet image-forming method of the present invention that relates to the above-mentioned ink-jet image-forming method is preferably provided with the following steps: the image areas are set in association with the respective dots, the dot area rate representing the dot density in each image area is calculated, a set of dots corresponding to the image areas in which the dot area rate becomes greater than a predetermined value is defined as a group of high-density dots, and upon forming the high-density dots, the slow-drying ink and the quick-drying ink are preferably used.

In the above-mentioned method, the image areas are set in association with the respective dots, and the dot area rate representing the density of dots formed in each image area is calculated. Then, with respect to a group of high-density dots that is a set of dots corresponding to the image areas in which the dot area rate becomes greater than a predetermined value, the slow-drying ink and the quick-drying ink are used to form the dots.

The dot area rate, which represents the density of dots, is defined in this manner so that it becomes possible to use the dot area rate as a scale for estimating the time required for drying ink. Further, in the case when only the slow-drying ink is used, the dot area rate at which the ink drying time starts to raise a problem is set as a predetermined value. Thus, with respect to a high-density dot group having a dot area rate exceeding this value, the slow-drying ink and the quick-drying ink are used so that the ink drying time can be shortened while preventing degradation in the image quality.

In other words, the slow-drying ink is properly used for the high-density dot group so that the amount of dots derived from the slow-drying ink is properly maintained; thus, the degradation in the image quality is reduced to a level that raises no problem in practical use, thereby making it possible to maintain high image quality. Moreover, for example, the slow-drying ink is properly replaced by the quick-drying ink so that the slow-drying ink dots are not superposed on each other; thus, the dot density formed by the slow-drying ink is reduced so that it is possible to prevent an increase in the drying time.

Moreover, since dot derived from the quick-drying ink are placed next to dot derived from the slow-drying ink or superposed thereon, the quick-drying ink gives influences in such a manner that it is possible to accelerate the absorption of the slow-drying ink into recording paper, and consequently to shorten the drying time.

As a result, it becomes possible to avoid a reduction in the printing speed while maintaining high quality of images to be formed.

Here, the setting of the image area and the calculation of the dot area rate are carried out, for example, in cells corresponding to the respective dots on a memory storing information for forming images in the image-forming apparatus. Thus, the number density and area density of the dots can be also used as the dot area rate.

In the ink-jet image-forming method of the present invention that relates to an ink-jet image-forming method using the dot area rate, it is preferable to use the slow-drying ink upon forming dot corresponding to the image areas in which the dot area rate becomes smaller than a predetermined value.

In the above-mentioned method, a portion in which the length of the ink-drying time raises no problem can be discriminated based upon the above-mentioned dot area rate. Therefore, upon forming dots in this portion, the slow-drying ink is used so that it is possible to provide high image quality.

In the ink-jet image-forming method of the present invention that relates to an ink-jet image-forming method using the dot area rate, upon forming the group of high-density dots, it is preferable to alternately arrange dot derived from the slow-drying ink and dot derived from the quick-drying ink.

When the density of dots is high with dots derived from the slow-drying ink superposing on each other, the ink drying time increases in particular in this portion.

In the above-mentioned method, a group of high-density dots are formed by alternately arranging the dots derived from the slow-drying ink and the dots derived from the quick-drying ink. Thus, it is possible to avoid dots of the slow-drying ink from being placed side by side, and consequently to avoid forming a portion at which dots of the slow-drying ink are superposed on each other or to minimize such a portion. Therefore, ink can be dried more efficiently, and it is possible to further prevent an increase in the ink drying time.

Moreover, since it is possible to avoid dots derived from the quick-drying ink from aggregating together, it becomes possible to uniform the color reproducibility at the respective portions, and consequently to provide high image quality.

As a result, the printing speed and the image quality can be improved.

In the ink-jet image-forming method of the present invention that relates to an ink-jet image-forming method using the dot area rate, upon forming the group of high-density dots, it is preferable to superpose the slow-drying ink and the quick-drying ink on each other.

In the above-mentioned method, by superposing the slow-drying ink and the quick-drying ink on each other, it is possible to uniform the color reproducibility (density) at each dot. In other words, the existence of the quick-drying ink makes it possible to accelerate the absorption of the slow-drying ink into recording paper. Therefore, it is possible to further shorten the drying time of the slow-drying ink. Since uniform color reproducibility is obtained at the respective dots, it becomes possible to provide high image quality.

In the ink-jet image-forming method of the present invention wherein the slow-drying ink and the quick-drying ink are superposed on each other, it is preferable to set the dot size of dot derived from the slow-drying ink that is superposed on the quick-drying ink to not more than a predetermined dot size.

In the above-mentioned method, the dot size of dot derived from the slow-drying ink is set to not more than a predetermined dot size, for example, to not more than a dot size that would form no superposed portions between dots or reduce such superposed portions to a minimum. With this arrangement, it is possible to fix the dot area rate of dots to not more than a predetermined value. Moreover, in the same manner as described above, the existence of the quick-drying ink makes it possible to accelerate the absorption of the slow-drying ink into recording paper. Therefore, it is possible to further shorten the drying time of the slow-drying ink.

Moreover, even if the above-mentioned dot size causes an insufficient portion, dots derived from the quick-drying ink can compensate for the insufficient portion, thereby making it possible to obtain a desired dot size and consequently to avoid degradation in the image quality.

Moreover, the above-mentioned method is also effectively used in the case when the dot size is variable.

In the ink-jet image-forming method of the present invention wherein the slow-drying ink and the quick-drying ink are superposed on each other, it is preferable to superpose the slow-drying ink on the quick-drying ink upon superposing the slow-drying ink and the quick-drying ink.

In the above-mentioned method, since the quick-drying ink forms the base of the slow-drying ink, it is possible to improve the absorption of the slow-drying ink into recording paper, and consequently to further shorten the drying time of the slow-drying ink. Moreover, since the slow-drying ink is located on the surface side, the color reproducibility is further improved, and the image quality is consequently improved.

In the ink-jet image-forming method of the present invention that relates to an ink-jet image-forming method using the dot area rate, it is preferable to prepare the slow-drying ink as black ink, and also to prepare the quick-drying ink as mixed color ink.

In the above-mentioned method, it is not necessary to separately prepare black ink serving as quick-drying ink. Therefore, with respect to the image-forming apparatus for carrying out the above-mentioned method, it is not necessary to separately prepare a head (ink-discharging system), etc., and those apparatuses that have the same head construction as conventional color image forming apparatuses may be used. Therefore, it is possible to easily construct an ink-jet image-forming apparatus that can exert the effects obtained by the above-mentioned methods.

Moreover, in the ink-jet image-forming method of the present invention that relates to an ink-jet image-forming method using the dot area rate, it is preferable to have the following arrangement: The slow-drying ink is prepared as black ink and the quick-drying ink is prepared as mixed color ink, and the above-mentioned image is given as a color image wherein, along a border portion between a black area and a color area, dots derived from the quick-drying ink are formed.

In the above-mentioned method, dots derived from the quick-drying ink are formed along a border portion between a black area and a color area in a color image; thus, it is possible to shorten the ink drying time and also to prevent black ink from spreading into the color area. Therefore, it becomes possible to further improve the image quality.

Furthermore, in the ink-jet image-forming method of the present invention that relates to an ink-jet image-forming method using the dot area rate, it is preferable to have the following arrangement: The slow-drying ink is prepared as black ink without using color mixture and the quick-drying ink is prepared as black ink, and the above-mentioned image is given as a color image wherein, along a border portion between a black area and a color area, dots derived from the slow-drying ink are formed.

In the case when dots are formed by mixing quick-drying ink along an outline portion of a black area in a color image, shaggy printing tends to occur at the outline portion of a black area due to irregularities in the dot diameter or the dot position. Moreover, upon superposing Y, M and C of quick-drying ink to form the second black dot, deviation in the dot position tends to occur in the direction toward the blank portion, resulting in irregularities in colors at the border portion on the blank portion side.

In the above-mentioned method, in order to solve the degradation in the image quality, an outline portion is discriminated by using a well-known outline extracting method such as an image shifting method, a primary differential filter, a Laplacian operation and a Hadamard transform so that dots along the outline portion of a black area of a color image are formed by using only black slow-drying ink without using color mixture.

With this arrangement, since the above-mentioned degradation in the image quality caused by the application of the quick-drying ink can be reduced, it becomes possible to further improve the image quality.

Here, by setting the dot area rate 50% as a predetermined value, even if positional deviations in mixed colors occur in an area other than the blank area or the outline area, they are covered with black dots, and reduced to a level causing no problem in practical use.

Moreover, in the ink-jet image-forming method of the present invention that relates to an ink-jet image-forming method using the dot area rate, it is preferable to set the dot area rate 50% as a predetermined value.

In the ink-jet image-forming method, the image-forming speed tends to decrease as the ink drying time increases, and the ink drying time tends to become longer as the dot density increases. In particular, at a point where the dot area rate exceeds 50% (the dot density at the time when half the dots of all the dots to be formed in the image area have been formed), superposed portions between the adjacent dots start to increase, and as the ink drying time increases, the image-forming speed comes to enter a range including a minimum value.

Therefore, in the above-mentioned method, by setting the dot area rate 50% as a predetermined value, the reduction in the image-forming speed can be alleviated to a level causing no problem in practical use.

Furthermore, in the ink-jet image-forming apparatus of the present invention that relates to an ink-jet image-forming apparatus using the dot area rate, it is preferable to have the following arrangement: The slow-drying ink is prepared as black ink without using color mixture and the quick-drying ink is prepared as black ink, and the above-mentioned image is given as a color image; and the discrimination means selects the slow-drying ink for forming dots along a border portion between a black area and a color area in the color image.

In the case when dots are formed by mixing quick-drying ink along an outline portion of a black area in a color image, shaggy printing tends to occur at the outline portion of a black area due to irregularities in the dot diameter or positional deviations of dots between K-block and Y-block, C-block and M-block of the heads, and irregularities in colors tend to occur at the border portion on the blank portion side due to positional deviations of dots toward the blank portion in individual Y, M and C dots to be superposed.

In the above-mentioned arrangement, in order to solve the degradation in the image quality, the discrimination means discriminates any outline portion by using a well-known outline extracting method such as an image shifting method, a primary differential filter, a Laplacian operation and a Hadamard transform so that dots along the outline portion of a black area of a color image are formed by using only black slow-drying ink without using color mixture.

With this arrangement, since the above-mentioned degradation in the image quality caused by the application of the quick-drying ink can be reduced, it becomes possible to further improve the image quality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ink-jet image-forming method, wherein dots are formed by using a slow-drying ink having a comparatively long drying time and a quick-drying ink having a comparatively short drying time so that the dots form an image, comprising the steps of:

discriminating a density of dots in an image area within a predetermined range based upon image data; and based upon the results of the discrimination, making a selection between slow-drying ink and quick-drying ink so as to form a dot.

2. The ink-jet image-forming method as defined in claim 1, comprising the steps of:
   setting an image area in association with each dot to be formed; and
   calculating a dot area rate representing the density of dots formed in each image area,
   wherein: a set of dots corresponding to the image areas in which the dot area rate becomes greater than a predetermined value is defined as a group of high-density dots, and upon forming the group of high-density dots, the slow-drying ink and the quick-drying ink are used.

3. The ink-jet image-forming method as defined in claim 2, wherein upon forming a dot corresponding to an image area in which the dot area rate is smaller than the predetermined value, the slow-drying ink is used.

4. The ink-jet image-forming method as defined in claim 2, wherein upon forming the group of high-density dots, dots derived from the slow-drying ink and dots derived from the quick-drying ink are alternately arranged.

5. The ink-jet image-forming method as defined in claim 2, wherein upon forming the group of high-density dots, the slow-drying ink and the quick-drying ink are superposed on each other.

6. The ink-jet image-forming method as defined in claim 5, wherein the dot derived from the slow-drying ink that is superposed on the quick-drying ink is set to have a dot size not more than a predetermined dot size.

7. The ink-jet image-forming method as defined in claim 5, wherein upon superposing the slow-drying ink and the quick-drying ink on each other, the slow-drying ink is superposed on the quick-drying ink.

8. The ink-jet image-forming method as defined in claim 2, wherein the slow-drying ink is black and the quick-drying ink forms a mixed color consisting of color inks.

9. The ink-jet image-forming method as defined in claim 2, wherein: the slow-drying ink and the quick-drying ink are black and the image is a color image, and at the border portion of a black area to a color area, dots derived from the quick-drying ink are formed.

10. The ink-jet image-forming method as defined in claim 2, wherein: the slow-drying ink is black that is not a mixed color and the quick-drying ink is black, and the image is a color image, and at the border portion of a black area to a color area, dots derived from the slow-drying ink are formed.

11. The ink-jet image-forming method as defined in claim 2, wherein the dot area rate is represented by a rate of the number of black dots with respect to the entire dots within the image area.

12. The ink-jet image-forming method as defined in claim 11, wherein upon forming a black dot corresponding to an image area having a dot area rate greater than the predetermined value, the black dot derived from the slow-drying ink and the black dot derived from the quick-drying ink are alternately arranged.

13. The ink-jet image-forming method as defined in claim 12, wherein upon forming a black dot on a dot adjacent to a color area, the black dot derived from the slow-drying ink and the black dot derived from the quick-drying ink are alternately arranged.

14. The ink-jet image-forming method as defined in claim 12, wherein upon forming black dots on dots adjacent to a color area, the dots are formed by using the slow-drying ink.

15. The ink-jet image-forming method as defined in claim 2, wherein the dot area rate is given as an average of rates of sizes of black dot to an optimal size of dot within the image area.

16. The ink-jet image-forming method as defined in claim 15, wherein upon forming a black dot on a dot which has a size not less than a predetermined reference dot size and which corresponds to an image area in which the dot area rate is greater than the predetermined value, the black dot derived from the quick-drying ink is formed with the actual dot size and the black dot derived from the slow-drying ink is formed thereon with the reference dot size.

17. The ink-jet image-forming method as defined in claim 16, wherein upon forming a black dot on a dot that is adjacent to a color area and has a size not less than a predetermined reference dot size, the black dot derived from the quick-drying ink is formed with the actual dot size and the black dot derived from the slow-drying ink is formed thereon with the reference dot size.

18. The ink-jet image-forming method as defined in claim 16, wherein upon forming a black dot on a dot that is adjacent to a color area, the black dot derived from the slow-drying ink is formed thereon.

19. The ink-jet image-forming method as defined in claim 16, wherein 50% of the optimal dot size is set as the reference dot size.

20. The ink-jet image-forming method as defined in claim 2, wherein 50% of the dot area rate is set as the predetermined value.

21. The ink-jet image-forming method as defined in claim 1, wherein the image area is a rectangular shape with a dot corresponding to the image area located in the center.

22. The ink-jet image-forming method as defined in claim 1, wherein the image area is a cross shape with a dot corresponding to the image area located in the center.

23. An ink-jet image-forming apparatus, which forms dots by using a slow-drying ink having a comparatively long drying time and a quick-drying ink having a comparatively short drying time so that the dots form an image, comprising:
   calculation means which, upon forming a dot, calculates a dot area rate that represents a density of the dots formed within a predetermined area for the dot, and
   discrimination means which, based upon the dot area rate, selects ink to be used from the slow-drying ink and the quick-drying ink.

24. The ink-jet image-forming apparatus as defined in claim 23, wherein: the calculation means sets the image area in association with the dot to be formed upon calculating the dot area rate, and
   in the case when a set of dots corresponding to the image areas in which the dot area rate is greater than a predetermined value is defined as a group of high-density dots, upon forming the group of high-density dots, the discrimination means selects at least either of the slow-drying ink and the quick-drying ink.

25. The ink-jet image-forming apparatus as defined in claim 24, wherein upon forming a dot corresponding to an image area in which the dot area rate is smaller than the predetermined value, the discrimination means selects the slow-drying ink.

26. The ink-jet image-forming apparatus as defined in claim 24, wherein upon forming the group of high-density dots, the discrimination means selects ink in such a manner that dots derived from the slow-drying ink and dots derived from the quick-drying ink are alternately arranged.

27. The ink-jet image-forming apparatus as defined in claim 24, wherein upon forming the group of high-density dots, the discrimination means selects ink in such a manner that the slow-drying ink and the quick-drying ink are superposed on each other.

28. The ink-jet image-forming apparatus as defined in claim 27, wherein, prior to superposition on the quick-drying ink, the discrimination means sets the dot derived from the slow-drying ink to have a dot size not more than a predetermined dot size.

29. The ink-jet image-forming apparatus as defined in claim 27, wherein upon superposing the dot derived from the slow-drying ink and the dot derived from the quick-drying ink on each other, the discrimination means selects ink in such a manner that the slow-drying ink is superposed on the quick-drying ink.

30. The ink-jet image-forming apparatus as defined in claim 24, wherein the slow-drying ink is black and the quick-drying ink forms a mixed color consisting of color inks.

31. The ink-jet image-forming apparatus as defined in claim 24, wherein in the case when the slow-drying ink and the quick-drying ink are black with the image being a color image, the discrimination means selects the dot derived from the quick-drying ink at the border portion of a black area to a color area.

32. The ink-jet image-forming apparatus as defined in claim 24, wherein in the case when the slow-drying ink is black that is not a mixed color and the quick-drying ink is black, with the image being a color image, the discrimination means selects the dot derived from the slow-drying ink at the border portion of a black area to a color area.

33. The ink-jet image-forming apparatus as defined in claim 24, wherein the calculation means calculates a rate of the number of black dots with respect to the entire dots within the image area as the dot area rate.

34. The ink-jet image-forming apparatus as defined in claim 33, wherein up on forming a black dot on a dot corresponding to an image area having a dot area rate greater than the predetermined value, the discrimination means selects ink in such a manner that the black dot derived from the slow-drying ink and the black dot derived from the quick-drying ink are alternately arranged.

35. The ink-jet image-forming apparatus as defined in claim 34, wherein upon forming a black dot on a dot adjacent to a color area, the discrimination means selects ink in such a manner that the black dot derived from the slow-drying ink and the black dot derived from the quick-drying ink are alternately arranged.

36. The ink-jet image-forming apparatus as defined in claim 34, wherein upon forming black dots on dots adjacent to a color area, the discrimination means selects the slow-drying ink.

37. The ink-jet image-forming apparatus as defined in claim 24, wherein the calculation means calculates an average of rates of sizes of black dot to an optimal dot size within the image area as the dot area rate.

38. The ink-jet image-forming apparatus as defined in claim 37, wherein upon forming a black dot on a dot which has a size not less than a predetermined reference dot size and which corresponds to an image area in which the dot area rate is greater than the predetermined value, the discrimination means selects ink in such a manner that the black dot derived from the quick-drying ink is formed with the actual dot size and the black dot derived from the slow-drying ink is formed thereon with the reference dot size.

39. The ink-jet image-forming apparatus as defined in claim 38, wherein upon forming a black dot on a dot that is adjacent to a color area and have a size not less than a predetermined reference dot size, the discrimination means selects ink in such a manner that the black dot derived from the quick-drying ink is formed with the actual dot size and the black dot derived from the slow-drying ink is formed thereon with the reference dot size.

40. The ink-jet image-forming apparatus as defined in claim 38, wherein upon forming a black dot on a dot that is adjacent to a color area, the discrimination means selects the black dot derived from the slow-drying ink.

41. The ink-jet image-forming apparatus as defined in claim 38, wherein the discrimination means sets 50% of the optimal dot size as the reference dot size.

42. The ink-jet image-forming apparatus as defined in claim 24, wherein the discrimination means sets 50% of the dot area rate as the predetermined value.

43. The ink-jet image-forming apparatus as defined in claim 23, wherein the calculation means sets the image area to have a rectangular shape with a dot corresponding to the image area located in the center.

44. The ink-jet image-forming apparatus as defined in claim 23, wherein the calculation means sets the image area to have a cross shape with a dot corresponding to the image area located in the center.

* * * * *